United States Patent [19]

Dirth

[11] 4,393,662
[45] Jul. 19, 1983

[54] CONTROL SYSTEM FOR REFRIGERATION OR AIR CONDITIONING INSTALLATION

[76] Inventor: George P. Dirth, 504 Cambrian Way, San Ramon, Calif. 94583

[21] Appl. No.: 306,207

[22] Filed: Sep. 28, 1981

[51] Int. Cl.³ .................. F25D 17/00; G05D 23/32
[52] U.S. Cl. ...................... 62/115; 62/157; 62/228; 62/180; 236/1 B; 236/46 F; 165/12
[58] Field of Search .......... 62/157, 158, 115, 231, 62/228 C, 196 A, 180; 236/46 F, 49, 1 E, 1 B, 78 D; 165/22

[56] References Cited

U.S. PATENT DOCUMENTS

| 4,136,392 | 1/1979 | Westphal et al. | 364/492 |
| 4,257,238 | 3/1981 | Kountz et al. | 62/228 |
| 4,307,576 | 12/1981 | Takano et al. | 62/231 |

Primary Examiner—Albert J. Makay
Assistant Examiner—Harry Tanner
Attorney, Agent, or Firm—Owen, Wickersham & Erickson

[57] ABSTRACT

A method and apparatus for controlling principle power consuming components such as compressors and fans for a refrigeration or air conditioning system so it will operate automatically with minimal energy consumption despite changing environmental and system conditions. The apparatus comprises a series of sensors to provide input data including the temperature from selected conditioned zones, valves for controlling coolant and refrigerant flow; switching devices for on-off control of the power components; and computing elements for receiving input data and constantly recomputing operating instructions for the power components that control their operation. The method used with the apparatus comprises dividing the total running time for system components such as the compressor and zone fans into equal sampling time periods; modulating the compressor to operate at a relatively high load level for a first predetermined power-on portion of each time period and then at a relatively low load level for the remaining power regulation portion of the period; calculating the amount of compressor energy needed to be added or substracted to maintain temperature equilibrium in the control zone; controlling the compressor to increase or decrease its full power cycle in the next succeeding time period; thereafter continuously adjusting the power and regulation cycles for the compressor in each time period based on the calculations made using the most recent temperature input data. Fans in selected cooling zones are controlled in a like manner during each of a continuous series of sampling time periods of greater length and using a separate two-mode controller function, to further help maintain set point temperature in all zones of the system.

9 Claims, 16 Drawing Figures

TYPICAL REFRIGERATION SYSTEM

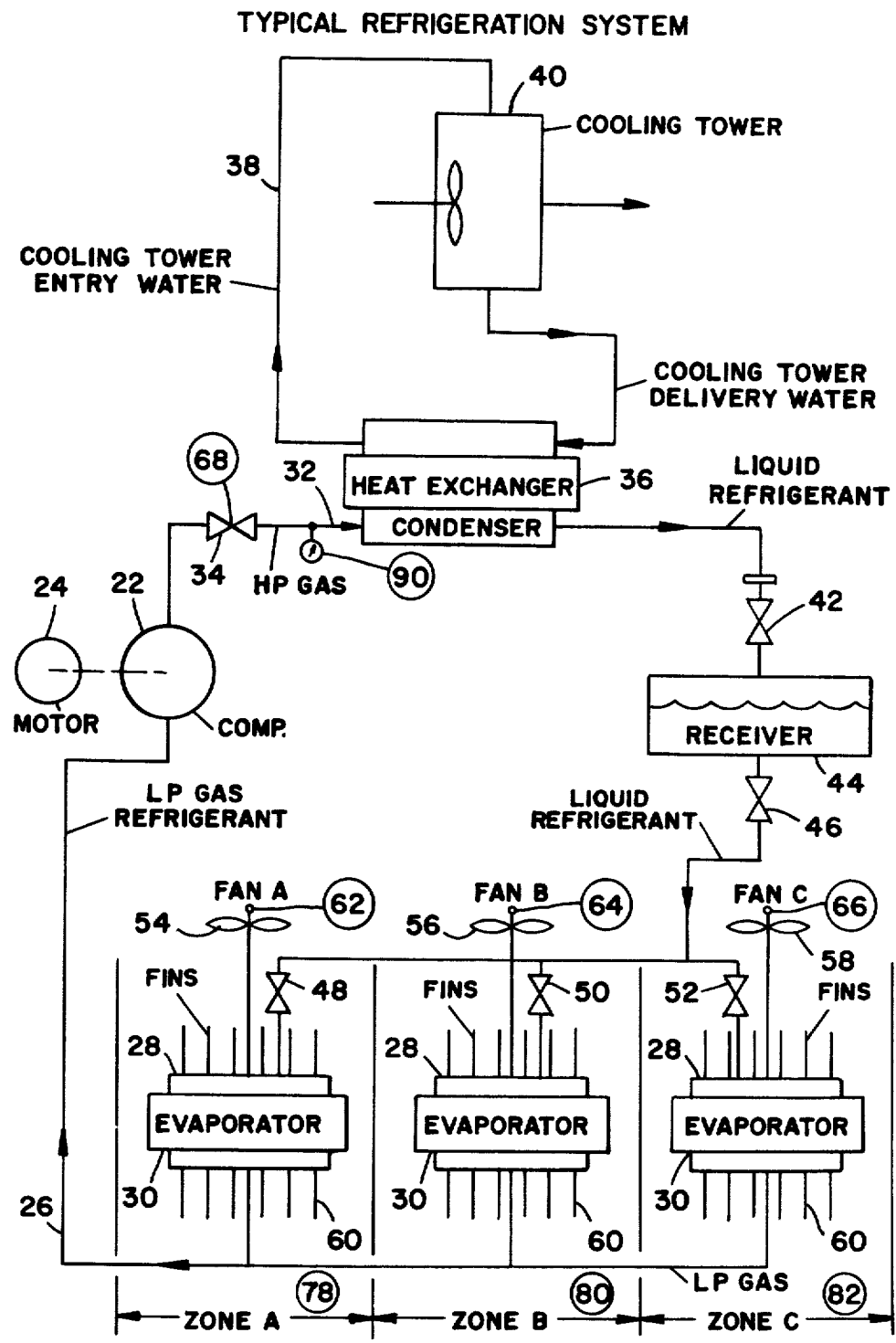
FIG _ 1

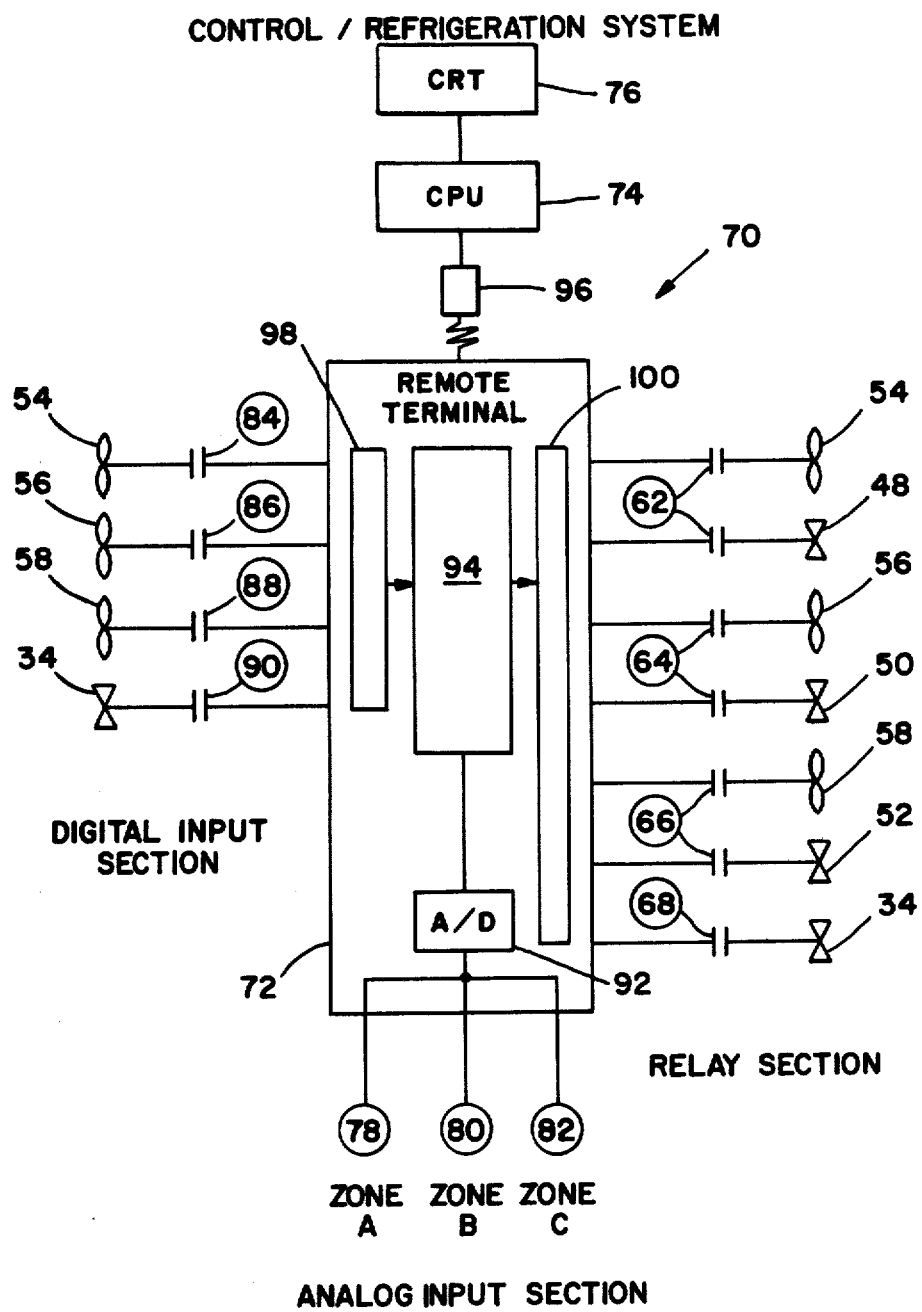
FIG_2

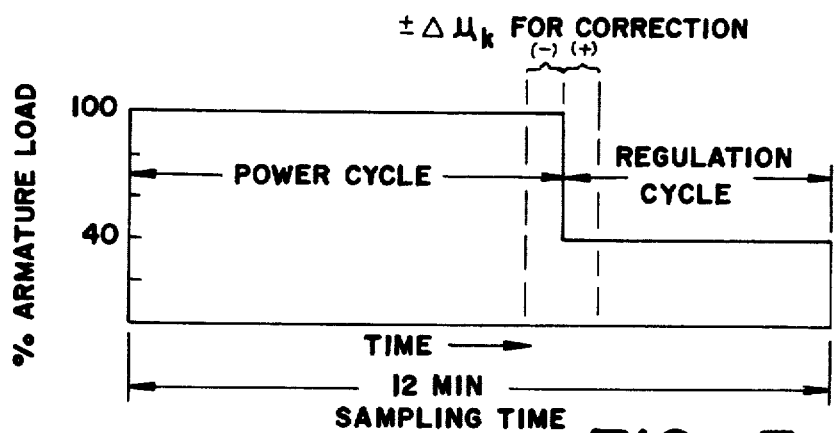
FIG_3
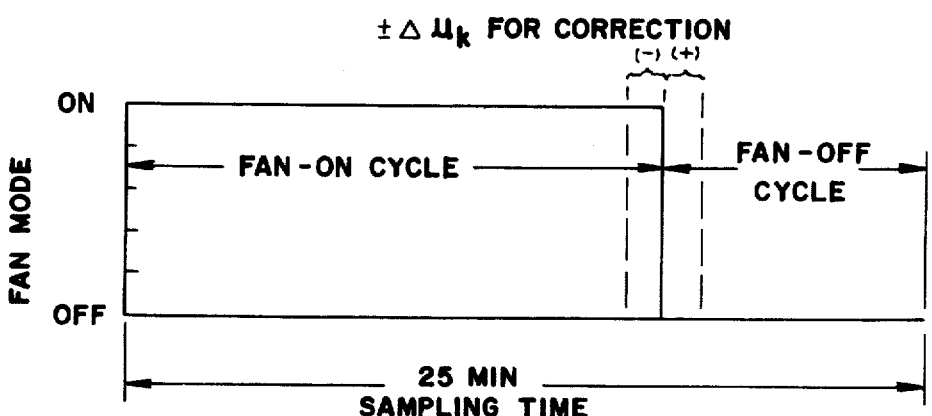
FIG_4
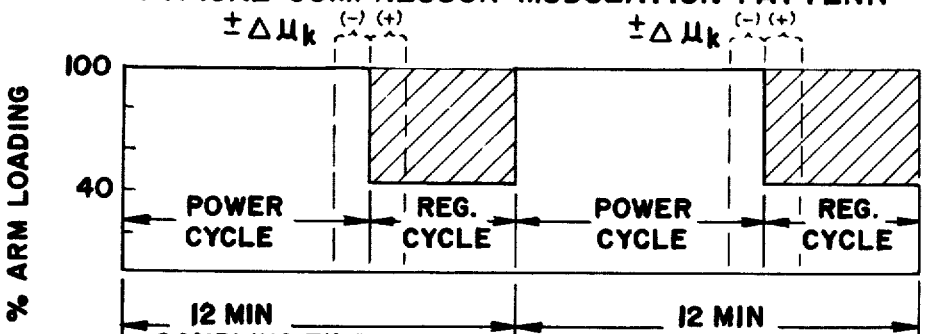
FIG_5

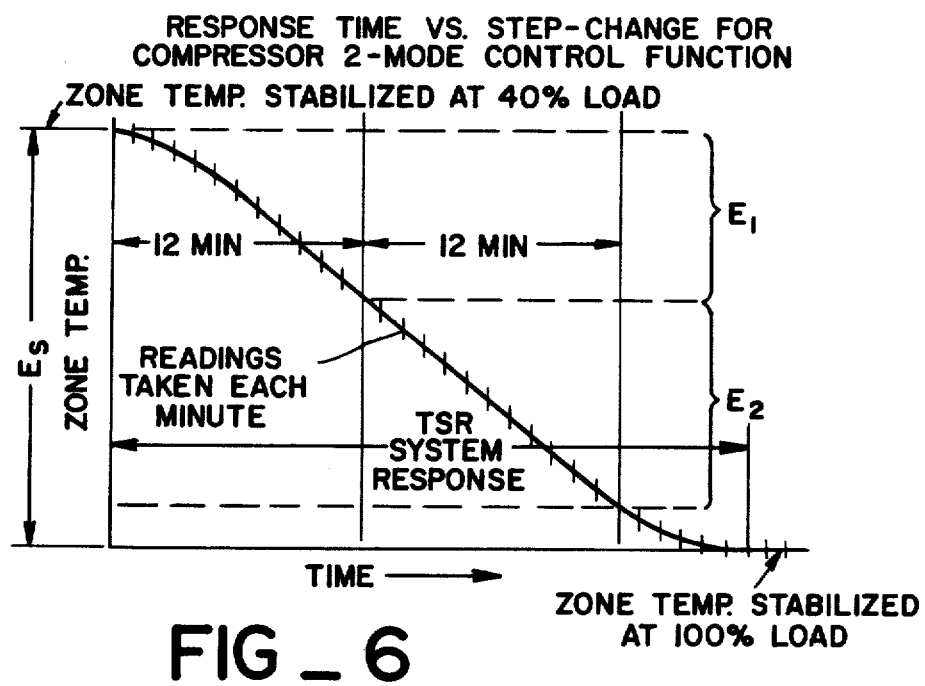
FIG_6
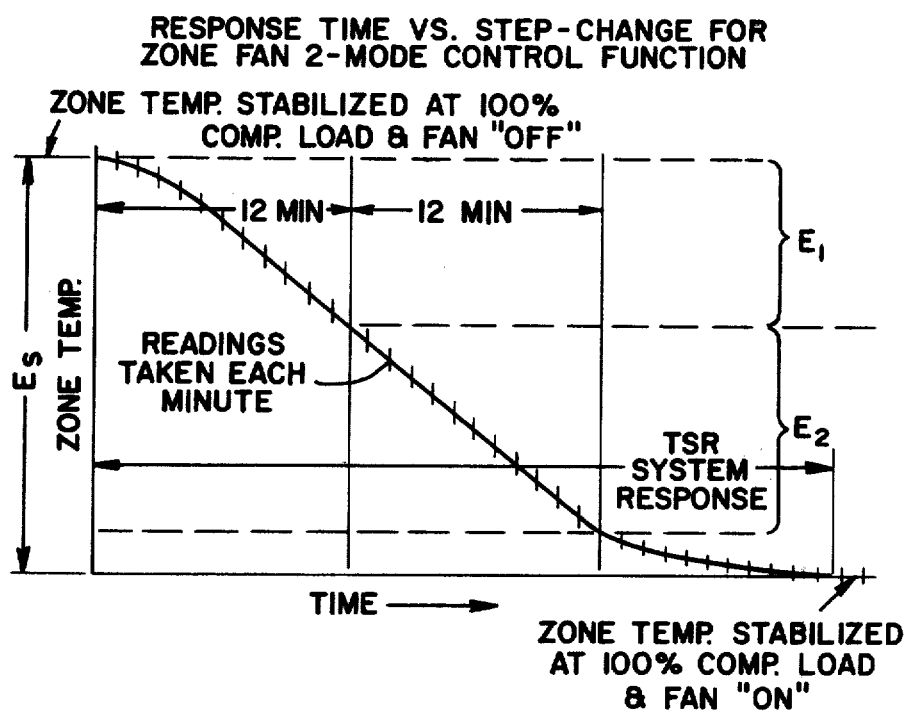
FIG_7

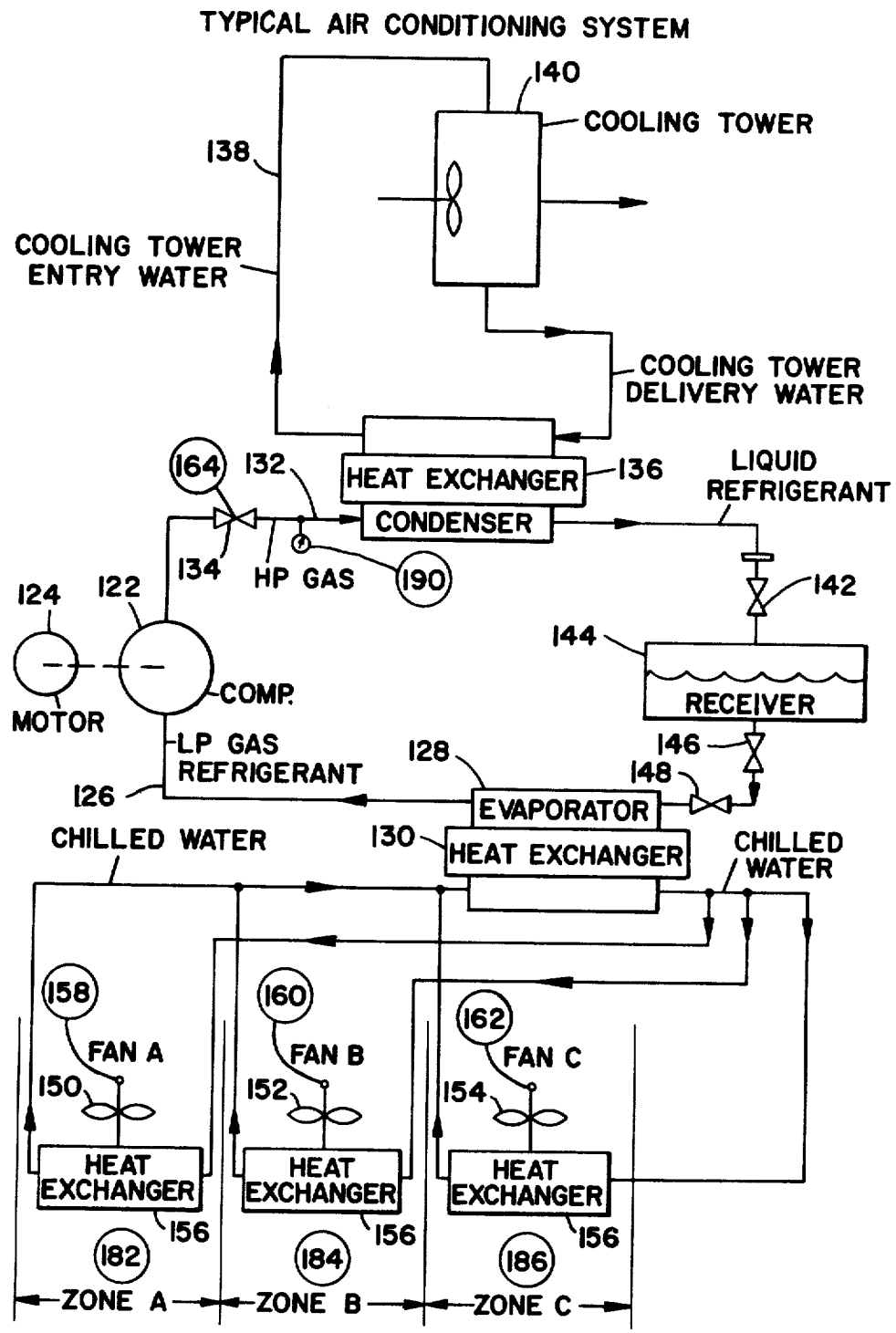
FIG_8

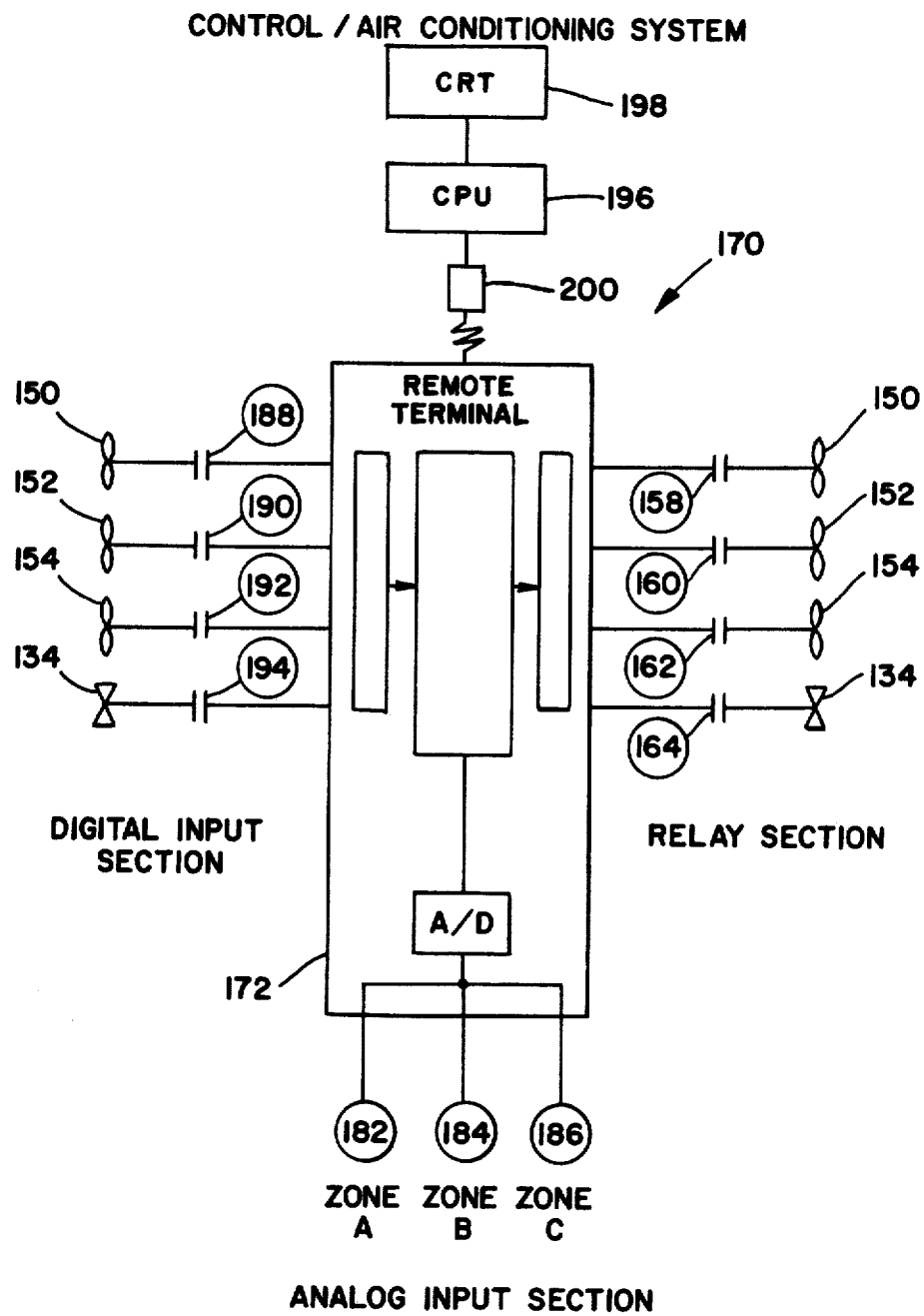
FIG_9

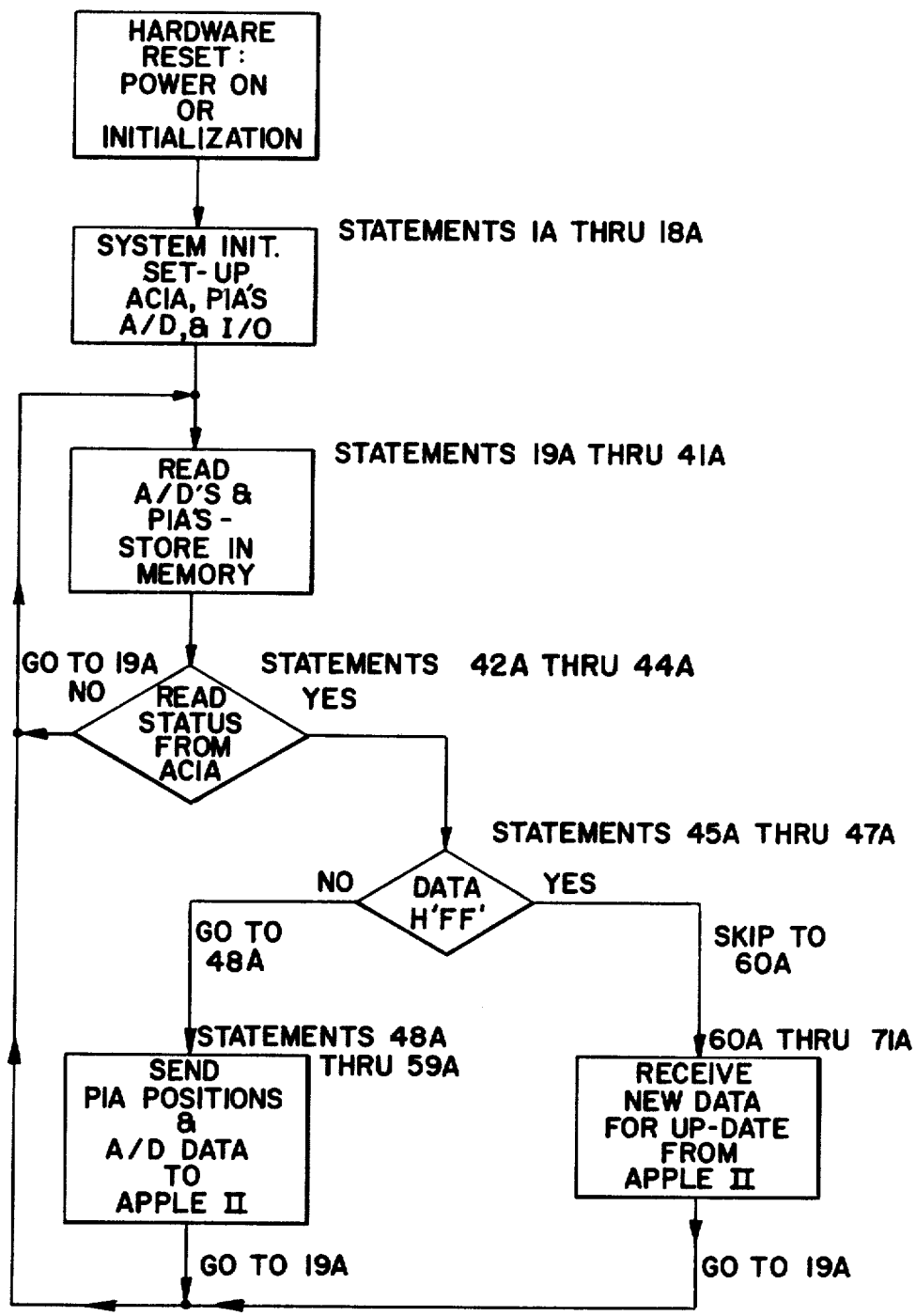
FIG _ 10

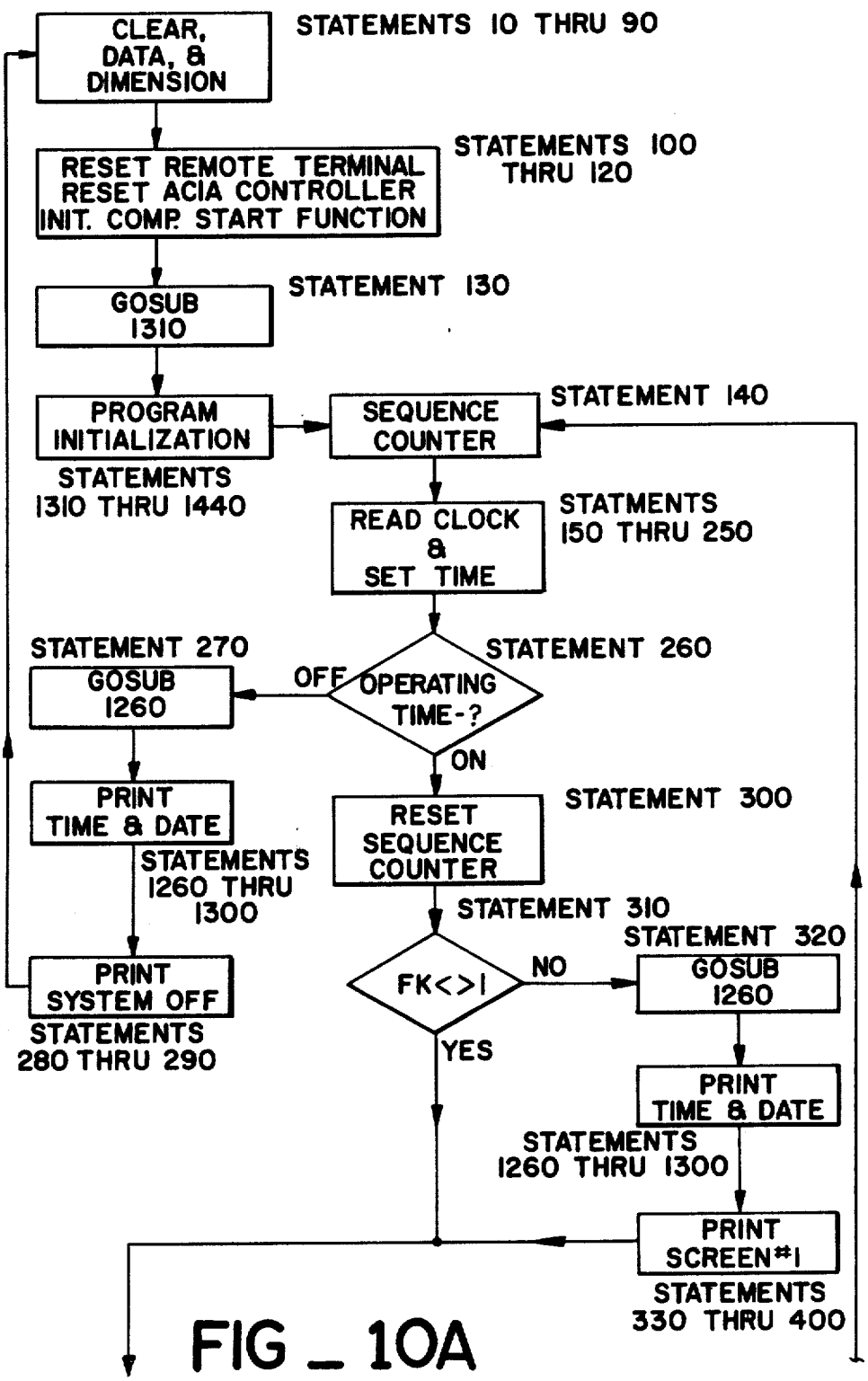
FIG _ 10A

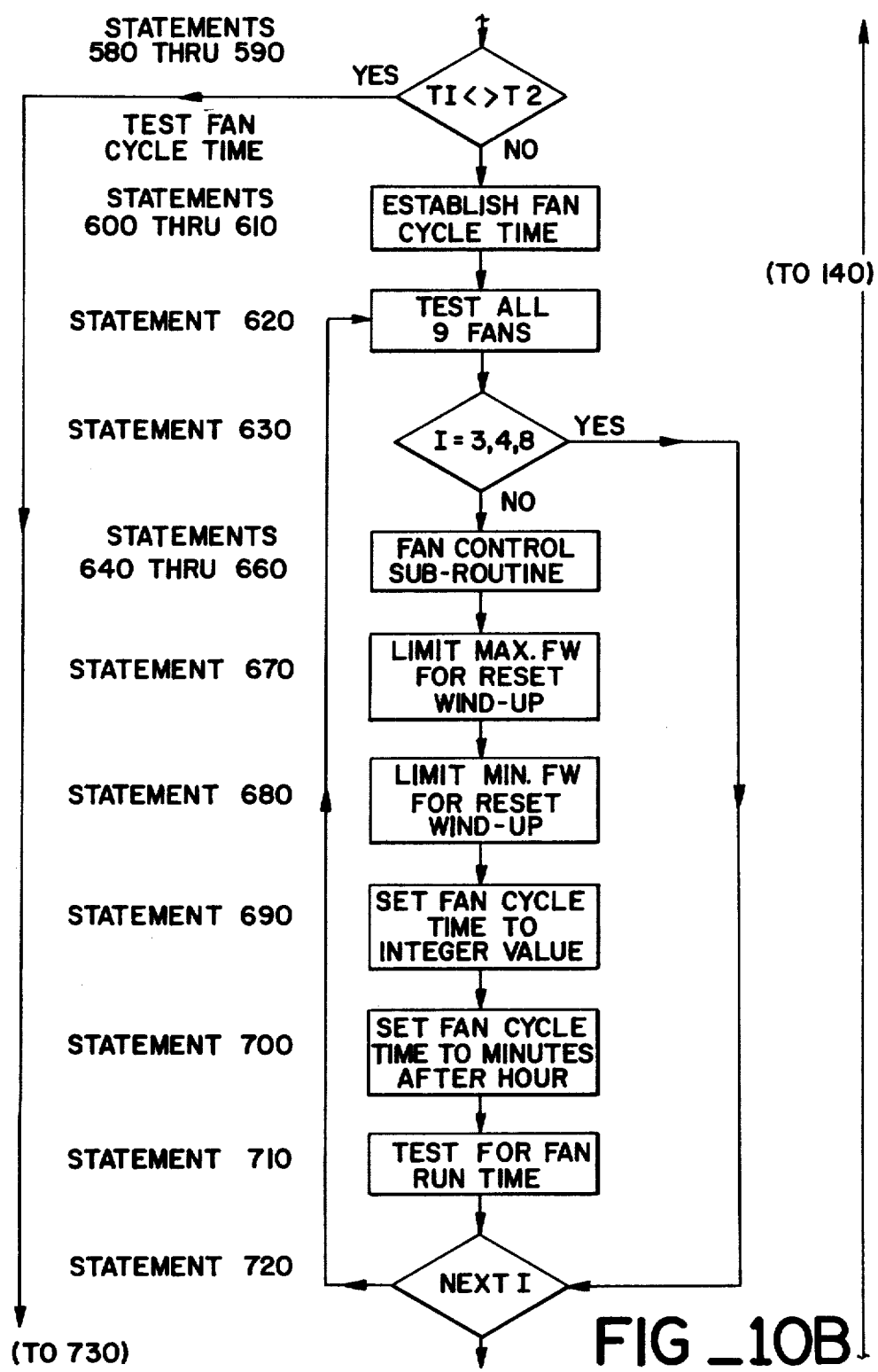
FIG_10B

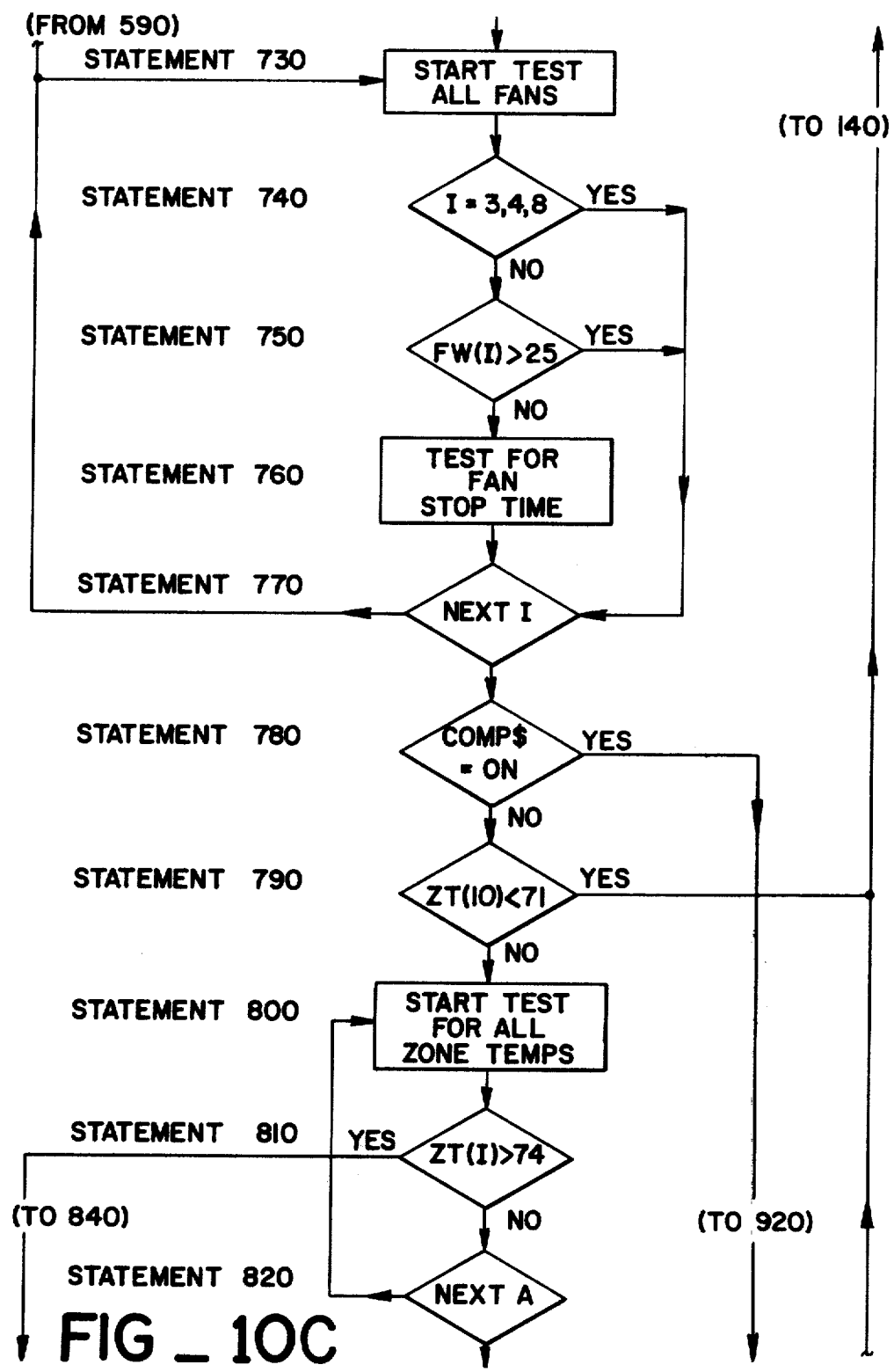
FIG _ 10C

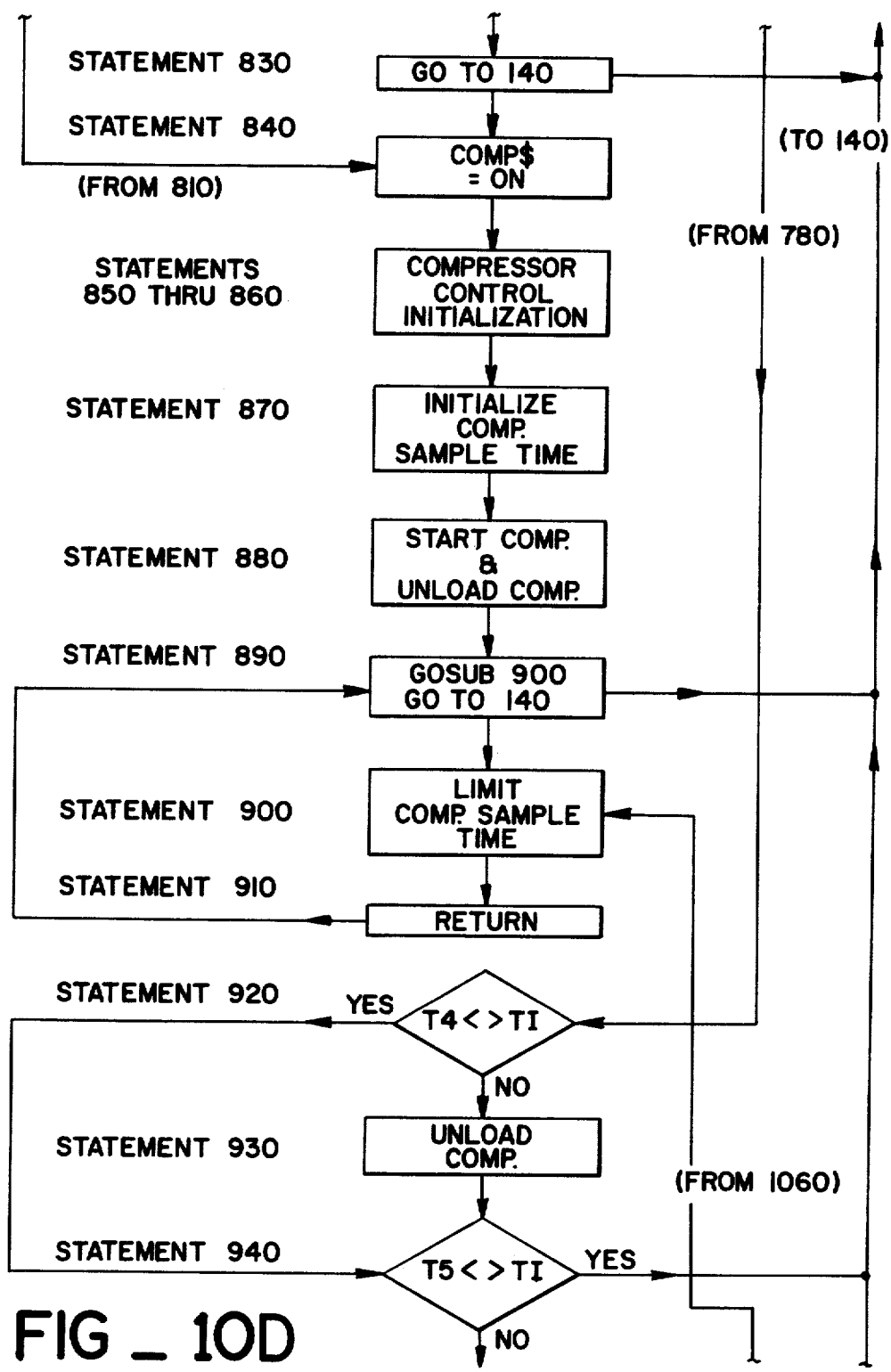
FIG _ 10D

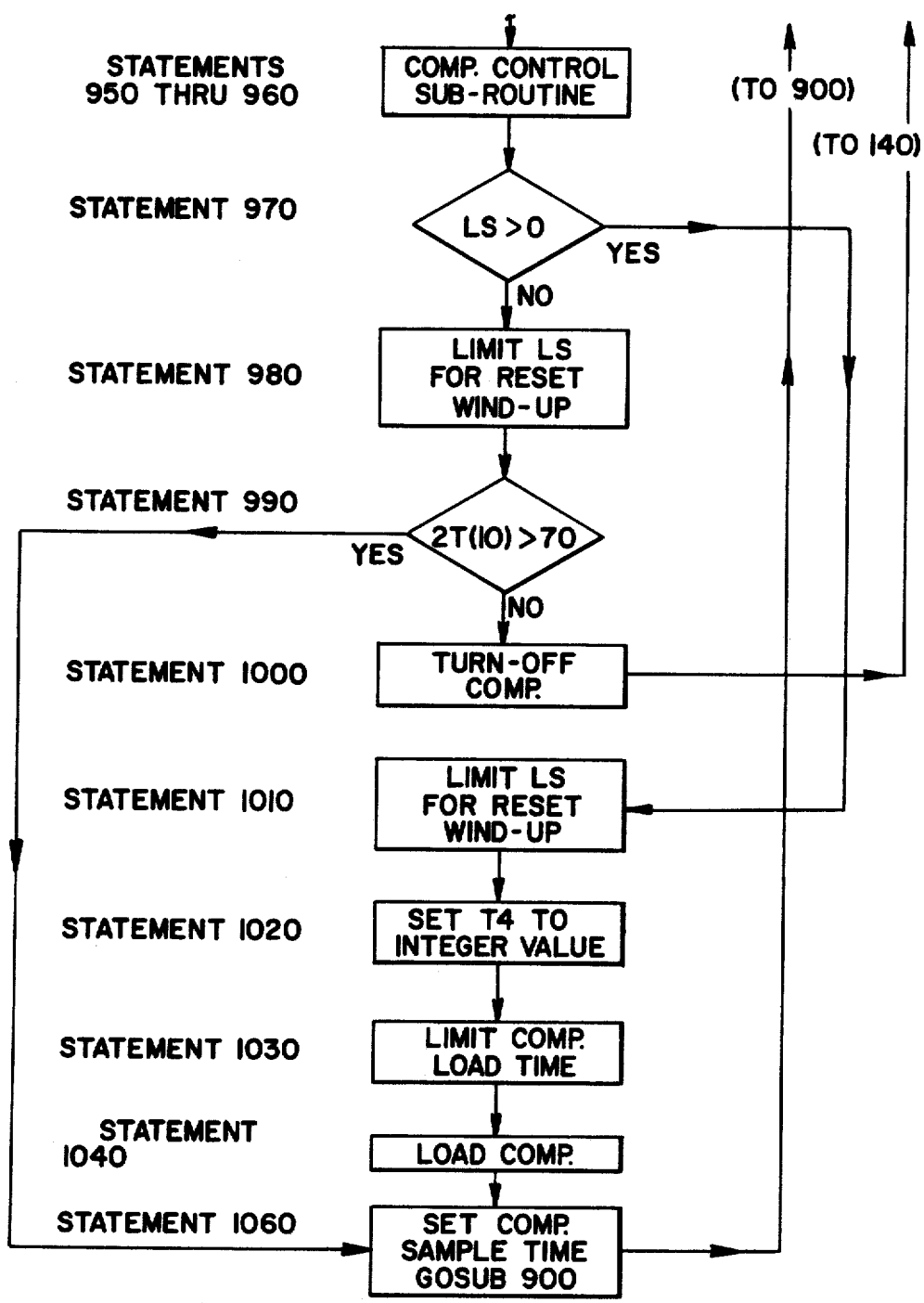
FIG _ 10E

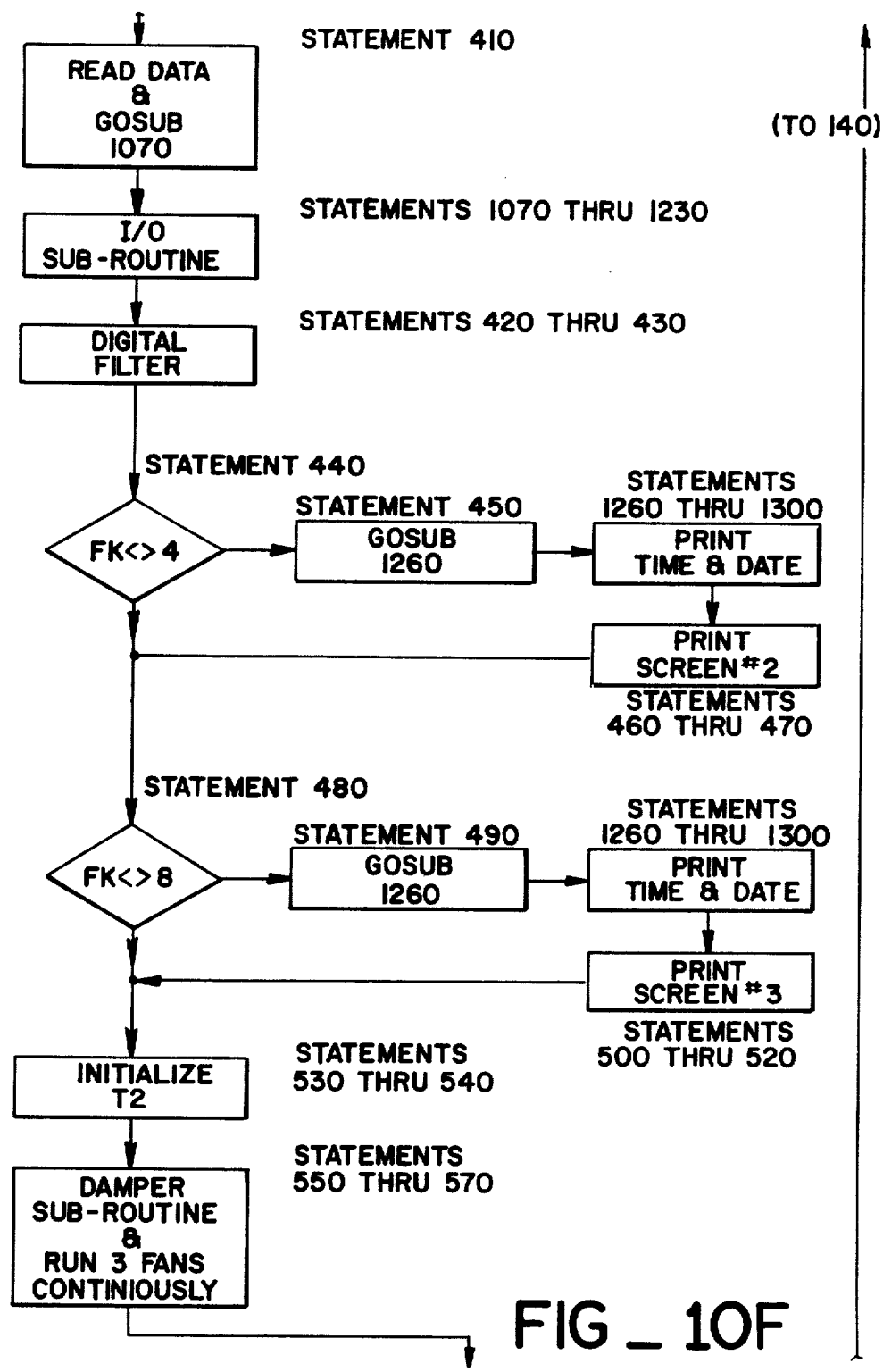

CONTROL SYSTEM FOR REFRIGERATION OR AIR CONDITIONING INSTALLATION

BACKGROUND OF THE INVENTION

This invention relates to automatic control systems and more particularly to such a control system for use with refrigeration installations for the purpose of causing the power consuming components of such installations to operate at minimal energy consumption while maintaining specified temperature levels in the zones controlled. The invention can also be used to control air conditioning systems which are a particular application of a refrigeration installation.

DESCRIPTION OF THE PRIOR ART

Designers of energy consuming refrigeration and air conditioning systems have long attempted to provide an acceptable efficiency level compatible with smooth and reliable operability. More recently, due to increasing energy shortages and rising costs, an urgent need arose to provide systems operable at near maximum efficiency and therefore at substantially reduced costs. Various approaches to the problem have been disclosed in the prior art wherein on-off control of the power consuming components of a system is maintained by remotely located computer control devices. Such a system is disclosed in U.S. Pat. No. 4,156,866. In U.S. Pat. No. 4,136,392, a control system for a building air conditioning system is described wherein power consuming load components are cycled on and off by computer control on the basis of a preprogrammed time sequence and other information related to the operational characteristics of each load. A similar automatic system for controlling environmental conditions in a building having a plurality of zones by controlling various heating and air conditioning appliances therein, is disclosed in U.S. Pat. No. 4,217,646. However, all the prior art related to such control systems and known to applicant, such as the aforesaid patents, have one or more disadvantage and do not provide the level of control efficiency that is attainable by the present invention. Not only are the prior art control systems relatively complex and complicated, but they fail to provide a mode of control that quickly senses trends in load conditions for appliances due to changing environmental conditions and then utilizes the sensed data to turn appliances on and off during preselected time periods, thereby consuming only the precise amount of energy necessary to maintain preselected equilibrium conditions.

It is therefore a general object of the present invention to provide an automatic control system for refrigeration installations that will enable their power consuming appliances to operate at maximum efficiency and thus, minimum cost.

Another object of the invention is to provide a power conserving control system adaptable for both refrigeration and air conditioning installations.

Yet another object of the invention is to provide a control system for a refrigeration or air conditioning system that produces an increased coefficient of performance and therefore requires less power consumption for operating the compressor of a refrigeration or air conditioning system.

Another object of the invention is to provide a control system for a refrigeration or air conditioning installation that can be easily installed and maintained with a minimum of highly skilled labor and that will provide automatic control as well as constant monitoring of controlled zones and component status for the installation.

Still another object of the invention is to provide a method for operating automatically a refrigeration or air conditioning system to maintain a critical zone temperature thereof at its preselected set point by turning the compressor and at least some fans of the system on and off during continuous, repetitive, time sampling periods and using a two-mode control function to calculate the "on" time for certain system appliances during each sampling period.

SUMMARY OF THE INVENTION

The aforesaid objective and the inherent advantages of the present invention are accomplished by a control system comprising a digital computer in combination with various sensors and actuating relays located in preselected zones and on the various power consuming appliances of a refrigeration system. The method format of the control system involves some fundamental arbitrary criteria:

(1) the selection of one zone as a typical or critical control zone from which a temperature is measured and supplied to the computer to provide a status input;

(2) the selection of equal operating time periods for each different group of appliances, such as compressors, fans or pumps.

The operating characteristics for each controlled appliance is governed by a two-mode control function which provides a predicted performance output. In each time period, the appliance is initially cycled to run at a preselected, relatively high performance level for a portion of the time period and then is turned off or down to a relatively low performance level for the remaining portion of the time period. At the end of each time period the status data is quickly surveyed and supplied to the computer which calculates (using the two-mode control function) what changes, if any, should be made to the "on" portion of the next time period. Thus, each power consuming appliance is controlled to operate for only that computed, optimum portion of each time period that is necessary and the various appliances (compressors and fans) are coordinated to maintain equilibrium conditions in the various zones of the refrigeration system.

In broad terms, the control system of the present invention enables a refrigeration or air conditioning system to operate with high efficiency and minimal power consumption of its electrically powered appliances despite fluctuations in environmental or load conditions. The ultimate minimizing of power consumption is achieved by causing selected appliances of the system such as compressors and fans to operate in "on" and "off" modes in each of a series of continuous time periods with the cycle time for each "on" mode of each appliance being determined on the basis of the two-mode control function and processed by controlling computer equipment using an appropriate program.

Other objects, advantages and features of the invention will become apparent from the following detailed description, presented in conjunction with the drawings.

BRIEF DESCRIPTION OF THE DRAWING

FIG. 1 is a schematic view of a typical refrigeration system adaptable to be controlled by the control system according to the present invention;

FIG. 2 is a schematic block diagram of a control system according to the present invention for use with the refrigeration system of FIG. 1;

FIG. 3 is a load diagram showing typical power and regulation cycles for a compressor sampling time period;

FIG. 4 is a load diagram showing typical "on" and "off" cycles for a fan sampling time period;

FIG. 5 is a diagram showing a typical compressor modulation pattern during consecutive time sampling periods according to the invention;

FIG. 6 is a typical curve of response time vs. zone temperature used for determining constant values in the two-mode control function for the compressor;

FIG. 7 is a typical curve of response time vs. zone temperature used for determining constant values in the two-mode control function for the fans;

FIG. 8 is a schematic view of a typical air conditioning system adaptable to be controlled by the control system according to the present invention;

FIG. 9 is a schematic block diagram of a control system according to the present invention for use with the air conditioning system of FIG. 8;

FIGS. 10 through 10F is a flow chart for a typical computer program used for implementing the present invention.

DESCRIPTION OF PREFERRED EMBODIMENT-THE REFRIGERATION SYSTEM

Referring to the drawing, FIG. 1 schematically depicts a typical refrigeration system 10 that is designed to maintain a plurality of zones at a predetermined temperature level despite fluctuations in the outside temperature and the changing internal heat load. As broadly depicted, such a system comprises a compressor 22, driven by a motor 24, and supplied with a compressable refrigerant gas (e.g., ammonia) via a conduit 26 from the evaporator sections 28 of a series of first heat exchangers 30, each located in a separate zone, e.g., A, B and C. The compressed refrigerant gas leaving the compressor is supplied through a high pressure gas line 32 having a controllable valve 34 and then through a second heat exchanger 36 where it is cooled and condensed by a continuous recirculating flow of water furnished in a conduit 38 from a cooling tower represented by the numeral 40. The liquid refrigerant from the second heat exchanger is furnished through a valve 42 on the inlet side of a receiver 44, through an outlet valve 36, and then to the evaporator sections 28 of the first heat exchangers 30 through expansion valves 48, 50, and 52. In each zone of a system is a fan, and these zone fans 54, 56 and 58 circulate air over typically finned exterior sections 60 of the first heat exchangers 30 to provide the required cooling or heat of refrigeration to the zones A, B, and C. In the system illustrated, only three zones A, B, and C are shown to conserve space, but it may be readily understood that a typical refrigeration system could have fewer, but more likely many more zones, depending on the size and type of refrigerated space. Also, these zone fans 54, 56 and 58 have controllable on-off switches or relays 62, 64 and 66 respectively, so that they may be operated at selective time intervals.

The compressor unloading valve 34 is controlled by a relay 68.

Associated with the refrigeration system and connected to various of its components, as will be hereinafter described, is a control system 70 embodying the principles of the present invention which causes the compressor "load" and "unload" and the fans to turn "on" and "off" in a unique manner to enable the refrigeration system to maintain the desired preset temperatures in the various zones with minimal power consumption for these system appliances.

As shown diagrammatically in FIG. 2, the control system 70 comprises a remote terminal 72 connected to a digital computer 74 (CPU) having internal logic and a memory and preferably a visual cathode ray tube display 76. The input to the remote terminal is connected to a plurality of sensors 78, 80, 82, 84, 86, 88 and 90 that provide data from various locations and appliances pertinent to the system being controlled. These sensors are labeled with selected number designations and their locations are also indicated by similar designations on FIG. 1. Again, the sensors shown are intended to represent typical sensor arrangements for the system depicted, but it should be understood that the number and types of sensors may vary for other refrigeration installations that may be controlled in accordance with principles of the present invention.

The remote terminal 72 functions to interface with and receive analog inputs from the various sensors; to convert the analog input signals to digital signals; to transmit asychronous data to the CPU; and to interface with and transmit digital data comprising feedback command signals to the various relays or control switches of the system.

In the typical refrigeration system shown in FIG. 1, a first group of sensors 78, 80 and 82 furnish analog input signals via suitable leads through an analog to digital converter 92 to the control system which include the following:

Sensor 78—Temperature Zone A
Sensor 80—Temperature Zone B
Sensor 82—Temperature Zone C In addition to the above sensors, a plurality of digital input devices 84, 86, 88 and 90 for the refrigeration system are provided to indicate "contact sense" or to indicate if the appliance is "on" in the case of zone fans 54, 56 and 58 or "actuated" in the case of valve 34. Such digital (contact) inputs are typically as follows:

Air flow switch 84—indicates fan 54 "on"
Air flow switch 86—Indicates fan 56 "on"
Air flow switch 88—Indicates fan 58 "on"
Pressure sensor switch 90—Indicates valve 34 is "closed" by sensing increased pressure in high pressure conduit 32

The various equipment actuators and switches for the refrigeration system will be controlled by relays which receive command signals via suitable leads from the control system including the following:

Relay 62—Control fan 54 and Expansion valve 48
Relay 64—Control fan 56 and Expansion valve 50
Relay 66—Control fan 58 and Expansion valve 52
Relay 68—Control compressor unloading valve 34

As shown in FIG. 2, the remote terminal 72 comprises a microcomputer 94 having a suitable microprocessor logic unit (e.g., a Motorola type 6800) connected to an Asychronous Communication Interface Adapter (ACIA) controller 96 (e.g., a Motorola type (6850) which establishes an internal interface register for the compatible central processing unit (CPU) 74 which can be a relatively small, personal type computer such as an "Apple II" computer. In the present invention, the microcomputer handles incoming data, sends command signals, and the computer processes the incoming data in accordance with predetermined functions, as will be described later on. Connected between the microcomputer and the analog sensors is the analog to digital converter 92 which may be any suitable 12 bit type that is commercially available. Inputs to the analog to digital converter are provided from the various temperature sensors 78, 80 and 82 in the system being controlled as listed above. Another controller 98 connected to the microcomputer and called a Peripheral Interface Adapter (PIA) (e.g., a Motorola type 6821) is also connected to interface with the aforesaid digital input devices 84, 86, 88 and 90 for the system. Yet another commercially available type controller 100 is connected to the output side of the microcomputer to provide an interface with the series of operating relays 62, 64, 66 and 68 for the system being controlled.

In the arrangement shown in FIG. 2, the remote terminal 72 is connected to the digital computer or CPU 74 with its CRT display 76 by a teletype line and thus the latter may be located at a convenient place some distance from the remote terminal. For example, the remote terminal can be located within close proximity to the system equipment such as compressors and the like, whereas it may be desirable to have the computer or CPU in an office where its display can easily be monitored. However, if desired, the CPU could be incorporated with the microcomputer at a unitary console using controller components that are compatible with the computer architecture.

Thus, with the control system components connected in the manner described, the various sensors provide constant analog and digital input data to the computer 74 via the remote terminal 72. Within the computer are performed the calculations that generate the output signals to the various system appliances which causes them to operate with a minimum of power consumption.

In carrying out the method of operation for the control system of the present invention, the overall preset control strategy, specified as follows, is applicable to most refrigeration systems:

(1) Selection of one zone as a typical or critical control zone from which a temperature is measured and supplied to the computer to provide a status input.

(2) Selection of an equal operating or sampling time period for the compressor and for the fans, during which these appliances will be modulated in "on" and "off" cycles.

(3) Operating the fan in the control zone continuously, while modulating the compressor during each of a series of successive sampling time periods and modulating the fans in the other zones during successive different sampling time periods.

(4) Selecting a desired set-point temperature for the control zone.

The critical or hot zone is selected to be the one with the greatest heat load or most subject to change, such as a zone nearest the door or entry to the refrigerated space. Sampling time periods for compressor and fans can, but do not have to, coincide. Typically, sampling time periods for compressors are less than sampling time periods for fans.

In the embodiment of the invention depicted in FIG. 1, assume that zone A is the critical (hot) zone and that fan 54 runs continuously while expansion valve 48 is open at all times. The compressor 22 is modulated on an on-off basis for each of a continuous series of equal sampling time periods, (e.g., 12 minutes). That is, for each time period, the compressor operates at a relatively high load (e.g., 100%) during a "power cycle" portion of the time period, and then at a relatively low load (e.g., 40%) during a "regulation cycle" portion comprising the remainder of the time period. (See FIG. 3). At the end of each time period the computer, using input data supplied thereto from sensor 78, calculates any change ($\Delta U_k$) in the time required to operate the compressor at its "power cycle" mode in order to supply the required heat of refrigeration to maintain the desired temperature in the control zone. At the end of each succeeding time period, the same calculation is made by the computer, and control signals are transmitted from the computer to the compressor to adjust (if necessary) the precise number of minutes in the next time period that the compressor must run to furnish equilibrium heat of refrigeration and thus maintain the target air temperatures in all the controlled zones. The aforesaid calculations made by the computer are made using a "two-mode controller function" as will be explained later on.

Typically, zones B and C are inherently cooler than zone A and their zone fans 56 and 58 with their refrigerant supply expansion valves 50 and 52 are modulated on an on-off basis to maintain target temperatures. As shown in FIG. 4, the modulation schedule for the fans is based on controlled on-off cycling during each of a continuous series of equal time periods, (e.g., 25 minutes). Thus, the fans and valves are turned "on" for a portion (e.g., 13 minutes) of a time period and then "off" for the remainder of the period. At the end of each period, the computer, using the input data supplied thereto, determines the length of the "on" time portion of the next period and controls the fans and valves accordingly for that period.

It is axiomatic that in refrigeration compressor operations, if the high pressure gas delivery pressure is increased, the compressor and armature loads both increase. And, if the delivery pressure is decreased, both compressor and armature loads decrease. One direct way of causing this to happen is to insert the valve 34 as shown in FIG. 1 in the high pressure gas line between the compressor and condensor. For example, in FIG. 3, initiating the valve 34 action increases the output pressure and loads the compressor to 100% load conditions. Opening the valve 34 decreases the output pressure and unloads the compressor to 40% load conditions. Almost all compressors manufactured in the United States today, having at least a 10 ton, nominal capacity or over, have incorporated in their controls some way of loading and unloading the compressors for different stages of load conditions. Some of these load/unload schemes operate by actuating multiple valves or multiple throttling valve positions in the high pressure gas line, while others operate by multiple valves or throttling valve positions in the compressor input low pressure gas line. Increasing low pressure gas pressure also increases compressor output pressure in the high pressure gas line. The inportant thing is that there is always some means available, such as the valve 34, to vary compressor loading and then to establish the load/unload pattern required to optimize the compressor according to principles of this invention.

Typical cycling patterns in successive time sampling periods obtained by loading and unloading the compressor 22 in FIG. 1, are shown in FIG. 5. During the power cycle the evaporator heat exchangers 30 temperatures are driven down and heat is absorbed into the system. Also, the condenser heat exchanger 36 is constantly transferring heat to the cooling tower water supply 38. Heat is rejected from the system by the action (heat of vaporization) of the cooling tower 40.

During the regulation cycle less heat is absorbed into the system by the evaporator heat exchanger 30. Also, less heat is transferred to the cooling tower water supply 38 by the condenser heat exchanger 36. However, the cooling tower 40 is still rejecting heat from the system and this results in a lower average condenser heat exchanger 36 temperature. This lowered average condenser heat exchanger 36 temperature is limited by: (1) The cooling tower 40 capacity to evaporate water; and (2) the outdoor wet bulb temperature.

In typical refrigeration compressor operation, if the condenser heat exchanger's temperature is lowered relative to the evaporator heat exchanger's temperature, the refrigeration cycle coefficient of performance (COP) will improve.

In the refrigeration cycle the refrigerant is compressed, cooled, and then expanded. In expanding, the refrigerant absorbs heat from the refrigerated space. After the refrigerant absorbs heat, the cycle is repeated. Compression raises the temperature of a low pressure gas to a temperature above that of a cooling medium or heat sink (cooling tower circulating water) so that it can give up its heat in a heat exchanger. Expansion lowers the refrigerant temperature below the temperature that is to be produced (target temperature in the refrigerated space). The sequence of processes performed by the refrigerant constituents the refrigeration cycle. The yardstick in measuring the performance of the refrigeration cycle is the Coefficient of Performance (COP), defined as the ratio of the heat removed (heat of refrigeration) to the work expended (heat rejected minus the heat removed).

Cycling a compressor in accordance with the present invention substantially improves a refrigeration system's COP. During the regulation cycle the following reactions occur:

(1) The refrigerant circulating mass flow is reduced in proportion to the lower compression ratio.

(2) The temperature of the compressed gas supplied to the condenser is lower also because of the reduced compression ratio.

(3) The heat rejected through the condenser heat exchanger is also less because of the lower compressed gas temperature and reduced mass flow rate of the refrigerant.

(4) The cooling tower water temperature is decreased because the cooling tower continues to reject heat at a constant rate.

(5) The evaporator heat exchanger absorbs less heat because of the reduced mass flow rate of the refrigerant to expand and absorb heat.

Now, during the regulation cycle time, the sequence of events, as listed above in steps 1 through 5, are repeated as the refrigeration cycle is repeated and the refrigerant is expanded, compressed, and expanded, etc., therefore, the compressed gas temperature entering the condenser is continuously driven down. Also, the cooling tower water temperature is continuously driven down because the cooling tower is still rejecting heat at a constant rate. When the next power cycle begins, both of these temperatures start to be driven upward and continue to be driven upward during the power cycle time. Howeve, neither temperature will be driven to as high a value that they would attain if the refrigeration system were operated in the conventional manner in steady state to a finite load level.

The phenomena is that the averages of both of these temperatures existing during successive sampling time periods of a two-mode control function are substantially less than they would be if the refrigeration system was operated continually in steady state in the conventional manner. The difference between these two average temperatures comprise the differential of heat transfer or rejection from the refrigeration system. It follows that if the transfer is taking place at relatively lower temperatures and at a smaller temperature differential, then relatively less heat is being rejected from the refrigeration system and, therefore, the system's COP has been improved.

As has been stated hereinbefore, the coefficient of performance is defined as the ratio of heat removed to the work expended or heat rejected minus the heat removed:

$$COP = \frac{Q_A}{W} = \frac{Q_A}{Q_R - Q_A}$$

Where:
$Q_A$ = Heat removed or heat of refrigeration
$Q_R$ = Heat rejected
$W$ = Work expended = $Q_R - Q_A$ It is clear then, that if the same heat or refrigeration is supplied by cycling the compressor in accordance with the present invention while rejecting less heat from the refrigeration system, that the COP has been improved.

If a refrigeration system is operated in accordance with the present invention, wherein the two-mode control function is holding the system in equilibrium to supply the heat or refrigeration required to maintain target temperature in the refrigerated space, the power cycle will furnish the required heat or refrigeration at a substantially improved COP. The effects of the regulation cycle will lower the temperature parameters governing refrigeration system heat rejection and continue to hold the refrigeration system COP in an improved condition. The power conserved during the regulation cycle will be the measure of the increased efficiency of the system.

When refrigeration systems are operated conventionally with the compressor in steady state under finite load conditions, the approximate system coefficient of performance is 4.7. Compressor load conditions are determined by a measure of "suction pressure" from the evaporator, "suction pressure" being analagous to evaporator temperature. Control of the compressor output pressure to increase or decrease compressor loading was normally provided by a suitable controller such as load/unload valves or the throttling valve 34, as shown in FIG. 1. Since the load/unload controls typically required a step change that was not too accurate, the compressor armature load on prior conventional systems was more than required and energy was wasted.

When a refrigeration system is operated in accordance with the present invention, the system is held in equilibrium at an accuracy of ±1% of the actual load required. The load control is considerably better and more accurate than conventional load controls and is multivariable instead of being step-change. Typical improved coefficient of performances of 6.7 may be attained at equilibrium conditions. Typical power savings realized in comparison to operating the system in the conventional manner are 30%.

Thus, a compressor operated according to the method of the present invention in typical load/unload cycle patterns as shown in FIG. 5, will be operating at:

(1) equilibrium load conditions
(2) maximum COP
(3) minimum possible power consumption.

As shown, the compressor operates at maximum COP during the power cycle and conserves power during the regulation cycle. The power or energy conservation is depicted as the crosshatched portion during the regulation cycle. The adjustment $\pm \Delta U_k$ is made using the two-mode control function at the end of each sampling time period to hold the compressor in equilibrium and furnish the required heat of refrigeration.

Two-Mode Control Function Applied to Compressor and Fans

As shown in FIGS. 3 and 4, a correction $\pm \Delta U_k$ is made at the end of each sampling time period for both the compressor and the modulated fans. Each correction factor is determined on the basis of one of two independent two-mode control functions: one for control of the compressor; and another for control of the fans. Both two-mode control functions are required because they control the transfer of heat out of the system through condenser heat exchanger 36 in FIG. 1, as well as the absorption of heat into the system through the evaporator heat exchangers 30. Also, the maximum attainable COP is a direct function of the average value of evaporator heat exchangers 30 temperature compared to the average value of condenser heat exchanger 36 temperature.

The sampling time for compressor two-mode control and the sampling time for fan two-mode control are both different and typical. Either sampling time can be any length as long as it does not exceed the two-mode controller's primary response time. A 12 minute sampling time interval for compressor control is selected because the interval is within the continuous 15 minute sampling time criteria for peak KW demand required by power suppliers and is also less than the two-mode controller's primary response time.

The 25 minute sampling time interval for fan control is selected because the interval is less than the two-mode controller's primary response time and the relatively long sampling time minimizes wear and tear on fan mechanical couplings and motor-starter contacts. The term $\pm \Delta U_k$, used with both two-mode control functions may be defined as:

(1) The incremental "power cycle" time correction at the end of each sampling interval to hold the compressor in equilibrium and furnish the required heat or refrigeration.

(2) The incremental "fan-on" time correction at the end of each sampling interval to hold the zone in equilibrium at the required target temperature.

The two-mode control function, also known as proportional plus integral control, was found to be particularly adaptable to the control of refrigeration systems because it is an accurate and reliable method of regulating a manipulated variable without excessive oscillations and it inherently allows for system delay.

In its generalized form, the two-mode control function is:

$$U = K_c(e + 1/T_i - e.dT)$$

where:

U = Manipulated variable
$K_c$ = Gain
e = Deviation or error
$T_i$ = Integral time of the control function In the method of this invention, a derived equation is used that takes into account:

(1) actual, observed, system gain;
(2) actual, observed, system delay.

The derived equation is:

$$\Delta U_k = \text{Gain}(e_k - ae_{k-1})$$

where:

$\Delta U_k$ = Incremental change in time (minutes) to hold system in equilibrium
Gain = Observed system gain in units of min/F.°
$e_k$ = Error in target temperature minus actual measured temperature in F.° at end of sampling time interval
a = Observed dimensionless constant that allows for system delay
$e_{k-1}$ = Error in target temperature minus actual measured temperature in F.° at end of last sampling time interval.

The derived equation $\Delta U_k = G(e_k - ae_{k-1})$ is used for both two-mode control functions. Initial values of "G" and "a" are both established for the compressor two-mode control by: (1) turning the fan "on" at its steady state in the "hot" zone; after the compressor has been stabilized at its 40% loading level (by manipulation of the valve 34); (2) introducing an abrupt step change in loading to maximum loading (100%) by manipulation of the loading valve; (3) plotting the temperature change in the controlled zone and measuring the "primary system response time" required to stabilize the system. From the plot of temperature vs. time, as shown in FIG. 6, the approximate value of "G" may be calculated by measuring $E_s$, which equals the step function change in zone temperature and $T_{sr}$, the response time for step function change. Therefore:

$$\text{``G''} \cong T_{sr}/E_s$$

To calculate the approximate value of "a", assume:

$E_1$ = Zone temperature change in the first 12 minutes
$E_2$ = Zone temperature change in the second 12 minutes $$\Delta U_k = G(e_k - ae_{k-1})$$

$E_s$ is a step change. There is zero change in $U_k$ in the second 12 minute sampling period, and therefore:

$$\Delta U_k = 0.$$

Thus:

$$0 = G(E_1 - aE_2)$$

$$a \cong E_1/E_2$$

Now, having established the best estimated values for the constants "G" and "a", they can be applied in a computer program for the system as the control system goes into operation. Later, the values of these constants can be changed slightly by trial and error until the two-mode controller function provides optimum compressor performance.

The procedure for further optimizing the values of "G" and "a" is as follows: (1) Hold "G" constant and vary "a" until the desired response is achieved; and (2) Hold "a" constant and increase "G" until the system starts to oscillate in values of $\Delta U_k$ in successive 12 minute sampling periods. Obviously, this is the limit for the value of "G" or gain of the system. The final value of "G" should be slightly less than the value which induced an oscillation in the output $\Delta U_k$; (3) Establish values of "G" and "a" for the fan two-mode control function.

Again, the constants "G" and "a" may be determined in the same manner applied to the compressor which involves introducing an abrupt step change, waiting for the system to recover or stabilize, and measuring the time for the system to recover. Thereafter, a graph is plotted of zone temperature vs. time.

Now, with the compressor at 100% loading in steady state and the other zone fans running in steady state, the fan in the test zone is turned off so that the temperature can stabilize at its highest value. Then, the test fan is turned "on" with its step change and zone temperature changes are plotted as shown typically in FIG. 6. From this plot, the approximate values of "G" and "a" can be ascertained. Thus, if the step function change in zone temperature is $E_s$, and the response time for the step function change is $T_{sr}$, then the gain "G"$\cong T_{sr}/E_s$. Further, applying the zone temperature change in the first 12 minutes of the period ($E_1$) and the zone temperature of the second 12 minutes ($E_2$) to the formula $\Delta U_k = -G(e_k - ae_{k-1})$, and assuming $E_s$ is a step change and $\Delta U_k = 0$ then:

$$0 = G(E_1 - aE_2)$$

$$a \cong E_1/E_2$$

Now, the constants "G" and "a" can be programmed in the computer and further optimized in the same manner as with the compressor in order to implement the two-mode control function with each fan. It is not necessary to establish a different two-mode control function for each fan.

Description of Air Conditioning Embodiment

Referring to the drawing, FIG. 8 schematically depicts a typical air conditioning system 120 that is designed to maintain a plurality of zones at a predetermined temperature level despite fluctuations in the outside temperature and the changing interval heat load. As broadly depicted, such a system comprises a compressor 122, driven by a motor 124, and supplied with a compressible refrigerant gas (e.g., freon) via a conduit 126 from the evaporator section 128 of a first heat exchanger 130. The compressed refrigerant gas leaving the compressor is supplied through a high pressure gas line 132 having a controllable throttling valve 134 and then through a second heat exchanger 136 where it is cooled and condensed by a continuous recirculating flow of water furnished in a conduit 138 from a cooling tower represented by the numeral 140. The liquid refrigerant from the second heat exchanger is furnished through a valve 142 on the inlet side of a receiver 144 through an outlet valve 146, and then to the evaporator section 128 of the first heat exchanger 130 through an expansion valve 148. A series of zone fans 150, 152 and 154 circulate air over separate heat exchangers 156 to provide the required cooling or heat of refrigeration to the zones A, B, and C, respectively. In the system illustrated, only three zones A, B and C are shown to conserve space, but it may be readily understood that a typical air conditioning system could have fewer, but more likely many more zones, depending on the size and type of conditioned space. Also, the zone fans 150, 152 and 154 have controllable on-off switches 158, 160 and 162 respectively, so that they may be operated at selective time intervals. Ducting for the system, with its conventional dampers, are typically also provided, but are not shown since they are not required for system control.

Associated with the air conditioning system and connected to various of its components, as will be hereinafter described, is a control system 170 embodying the principles of the present invention and similar to the control system 70 for the refrigeration system which causes the compressor and the fans to turn "on" and "off" in a unique manner to enable the air conditioning system to maintain desired preset temperatures in the various zones with minimal power consumption for its system appliances.

As shown diagrammatically in FIG. 9, the control system 170 is similar in its arrangement of components to the control system 70 and comprises a remote terminal 172 connected to a digital computer 196 (CPU) having internal logic and a memory and preferably a visual cathode ray tube display 198. The input to the remote terminal is connected to a plurality of sensors 182, 184, 186, 188, 190, 192 and 194, that provide data from various locations and appliances pertinent to the system being controlled. These sensors are labeled with selected number designations and their locations are also indicated by similar designations on FIG. 8. Again, the sensors shown are intended to represent typical sensor arrangements for the system depicted, but it should be understood that the number and types of sensors may vary for other air conditioning installations that may be controlled in accordance with principles of the present invention.

The remote terminal 172 functions to interface with and receive analog inputs from the various sensors; to convert the analog input signals to digital signals; to transmit asynchronous data to the CPU; and to interface with and transmit digital data comprising feedback command signals to the various relays or control switches of the system.

In the typical air conditioning system shown in FIG. 8, a first group of sensors 182, 184 and 186 furnish analog input signals via suitable leads to the control system which include the following:

Sensor 182—Temperature Zone A
Sensor 184—Temperature Zone B
Sensor 186—Temperature Zone C In addition to the above sensors, a plurality of digital input devices 188, 190, 192 and 194, for the air conditioning system are provided to indicate "contact sense" or to indicate if the appliance is "on" in the case of zone fans 150, 152 and 154, or "closed" in case of throttling valve 134. Such digital (contact) inputs are typically as follows:

Air flow switch 188—Indicates Fan 150 "on"
Air flow switch 190—Indicates Fan 152 "on"
Air flow switch 192—Indicates Fan 154 "on"
Pressure sensor switch 194—Indicates valve 134 "closed" by sensing increased pressure in high pressure conduit 132

As shown in FIG. 9, a remote terminal 172, similar to the remote terminal 72, is provided and comprises a microcomputer having a suitable microprocessor logic unit connected to an Asychronous Communication Interface Adapter (ACIA) controller 200 which establishes an internal interface register for the compatible central processing unit (CPU) 196. Connected between the microcomputer and the analog sensors is an analog to digital converter, and inputs to it are provided from the various temperature sensors 182, 184 and 186, in the system being controlled. Another controller connected to the microcomputer and called a Peripheral Interface Adapter (PIA) is also connected to the aforesaid digital input devices 188, 190, 192 and 194 for the system. Yet another controller is connected to the output side of the microcomputer to provide an interface with the series of operating relays 158, 160, 162 and 164, for the system being controlled. As with the refrigeration system, the remote terminal 172 is connected to the digital computer or CPU 196 having its CRT display 198 located at a convenient place that may be located at some distance from the remote terminal. Thus, with the control system components connected in the manner described, the various sensors provide constant analog and digital input data to the computer 196 via the remote terminal 172. Within the computer are generated the output signals to the various system appliances which causes them to operate with a minimum of power consumption.

In carrying out the method of operation for the air conditioning control system of the present invention, an overall present control strategy is specified which is applicable to most air conditioning systems, namely: (1) The selection of one zone as a typical or critical control zone from which a temperature is measured and supplied to the computer to provide a status input; and (2) The selection of equal operating or sampling time periods for the compressor and fans.

Usually, the critical or hot zone is the one having the largest solar loads. Sampling time periods for compressor and fans can, but do not have to, coincide. Typically, sampling time periods for compressors are less than sampling time periods for fans.

In the embodiment of the invention depicted in FIG. 8, assume that zone A is the critical (hot) zone and that fan 150 runs continuously, furnishing cooling from heat exchanger 156. The compressor 122 is modulated on an on-off basis for each of a continuous series of equal sampling time periods (e.g., 12 minutes). That is, for each time period, the compressor operates at a relatively high load (e.g., 100%) during a "power cycle" portion of a time period, and then at a relatively low load (e.g., 40%) during a "regulation cycle" portion comprising the remainder of the time period. At the end of each time period the computer, using input data supplied thereto from sensor 182, calculates any change in the time required to operate the compressor at its "power cycle" mode in order to supply the required heat of refrigeration to maintain the desired temperature in the control zone. At the end of each succeeding time period, the same calculation is made by the computer, and control signals are transmitted from the computer to the compressor to adjust (if necessary) the precise number of minutes in the next time period that the compressor must run to furnish equilibrium heat of refrigeration and thus maintain the target air temperatures in all the controlled zones.

Typically, zones B and C are inherently cooler than zone A and their fans 152 and 154 are modulated on an on-off basis to maintain target temperatures. The modulation schedule for the fans is based on controlled on-off cycling during each of a continuous series of equal time periods (e.g., 25 minutes). Thus, the fans ae turned "on" for a portion (e.g., 13 minutes) of a time period and then "off" for the remainder of the period. At the end of each period, the computer, using the input data supplied thereto, determines the length of the "on" time portion of the next period and controls the fans accordingly for that period. (Refer to FIG. 4).

The air conditioning system operates exactly as hereinbefore described in the embodiment of the invention. It is another form of a refrigeration system and essentially the only difference is that zones A, B and C are cooled by fans blowing air over chilled water cooled heat exchangers instead of blowing air over direct-expansion (D-X) finned heat exchangers.

Control System Software

The installation of the control system 20 for a typical refrigeration system, as shown in FIG. 1, or for an air conditioning system, as shown in FIG. 8, can be readily made using well known electrical procedures and with the selection and appropriate placement of suitable sensors. The computer with its CRT display and/or printer may be located remote from the compressor and other appliances such as in an office or room of the building where the control system can be easily operated and monitored.

In the operation of a control system according to the invention, assuming its installation in conjunction with an air conditioning system with all lead connections between the control components and the sensors and relays properly installed, and assuming the air conditioning system is operating, the computer is activated and a prepared program adapted for the particular air conditioning system is commenced.

The analog inputs from the various temperature sensors are converted to digital inputs to the remote terminal by the 12 bit analog to digital converter 68. The digital inputs from the various switches, etc. are furnished to the PIA controller 98 which assigns a binary "1" or "0" to each bit of 4 bytes (8 bits) of the remote terminal memory for system contacts that are open (1) or closed (0). Output data from the remote terminal is sent to the relays of the air conditioning equipment through the contact closure module. Each relay contact is assigned a binary "1" (close) or "0" (open) into each bit of 4 bytes in the remote terminal memory for all of the contacts that are to be closed ("1") or opened ("0").

When the remote terminal sends data to the CPU it sends 68, 8 bit, bytes, in serial, asynchronous, transmission. The data is sent sequentially as one start bit, 8 bits (no parity) and one stop bit; until all 68 bytes have been transmitted. All 68 bytes are in binary form as strings of binary numbers.

The first 64 bytes represent the 32 analog input values. Each analog input requires 2 bytes or 16 bits. The CPU discards the last 4 bits and translates the remaining 12 bits into a decimal number that represents that particular value of analog input.

The last 4 bytes contain digital input information that has been put into 4 bytes of memory by the PIA controllers in a binary form representing 32 digital inputs as binary "1" (off) or binary "0" (on). The CPU takes these 4 bytes and arranges them in sequential order in an array (vector) that represents digital inputs 1 through 32 as "1" (off) or "0" (on).

When the CPU sends information to the remote terminal it takes commands stored sequentially in an array as "1" (turn relay on) or "0" (turn relay off). It converts them into 4 bytes of binary numbers that the AICA controller sends to the AICA controller of the remote unit. The 4 bytes are then stored in memory and the remote unit functions through its contact closure module to turn the appropriate relays on ("1" command) or off ("0" command) for all 32 relays.

This straightforward transmission method between CPU and remote terminal is simple, reliable, and needs less software overhead than other methods.

The remote unit interfaces the computer system to the building air conditioning equipment and can utilize up to 32 analog inputs, 32 digital inputs, and 32 relay outputs.

Shown in FIGS. 10 through 10F is a flowchart of remote terminal software with statement numbers referring to an assembler program for the computer of the control system. This program takes 750 bytes of storage and is stored in a programmable read only memory (PROM) within the remote terminal.

The first block in FIGS. 10 through 10F is a hardware function that occurs at either of two events:
(1) Power "on" to the remote terminal
(2) Initialization command from the CPU.

Statements 1A through 18A—reset AICA and set AICA for 8 bit (no parity) transmission and set PIA's to all inputs. Clear all memory locations and set up analog/digital converter hardware and contact closure hardware.

Statements 19A through 41A—read all analog input points through analog/digital converter and all digital input points through PIA controller and store all readings in memory.

Statements 42A through 44A—test AICA for data ready. CPU AICA will indicate to remote AICA when it is ready to send or receive data.

Statements 45A to 47A—test for hexidecimal character "FF". Hex "FF" is binary 00. If first byte of transmission is in a string of 0's, then CPU has contact closure information for remote unit.

Statements 48A to 59A—send analog input values and digital input information to CPU through AICA controller. Return to first read statement 19A.

Statements 60A to 71A—receive new up-date data from CPU. Close or open contacts (relays) as required and test for completion. Return to first read statement 19A.

The CPU or main system software is written in high level language (BASIC). Once the remote terminal utility software has been established it is used over and over again and in effect, becomes hardware. Main system software, on the other hand, can be tailored to each building's unique requirements and changed as conditions dictate. For example, the tuning constants "G" and "a" of the two-mode controller functions can be changed when required.

An important aspect of this invention is that it can be readily and economically implemented by relatively unskilled or novice programmers using a simple but unique computer program adapted for a CPU, such as an "Apple II" home computer. Following is such a program for implementing the method of the present invention tailored for an air conditioning system installed in a three-story building, having three zones per floor, with zone 4 being the so-called "hot" zone.

```
10   CLEAR
20   DATA "JANUARY", FEBRUARY", "MARCH", "APRIL", "MAY",
     "JUNE", "JULY", "AUGUST", "SEPTEMBER", "OCTOBER",
     "NOVEMBER", "DECEMBER"
30   DATA 0.1117,150.4,0.1112,148.3,0.1114,153.3
40   DATA 0.1062,141.3,0.1117,150.2,0.1109,151.7
50   DATA 0.1130,150.8,0.1138,156.5,0.1113,149.2
60   DATA 0.06557,133.44
90   DIM 10%(68),AZ%(32),AY%(32),AX%(32),ZT(32)
100  POKE - 16240,96: FOR I = 1 TO 100: NEXT 1
110  POKE - 16240,3: POKE - 16240,21
120  COMP$ = "OFF":TI$ = "FIRST"
130  GOSUB 1310
140  FK = FK + 1
150  IN# 3: PR# 3
160  INPUT "";T$: IN# 0: PR# 0
170  MTH$ = LEFT$ (T$,2):DAY$ = MID$ (T$,4,2):HOUR$ = MID$
     (T$,7,2):MINUTES$ = MID$ (T$,10,2):SEC$ = MID$
     (T$,13,2)
180  HOUR = VAL (HOUR$):HR = HOUR
190  IF HR = 0 THEN HOUR = 12
200  IF HR > 12 THEN HOUR = HR - 12
210  AMPM$ = "AM"
220  IF HR > 11 THEN AMPM$ = "PM"
230  MTH = VAL (MTH$)
240  RESTORE
250  FOR I = 1 TO MTH: READ MTH$: NEXT 1
260  IF VAL (HOUR$) > 6 AND VAL (HOUR$) < 21 THEN GOTO 300
270  GOSUB 1260
280  VTAB 5: HTAB 10: PRINT "SYSTEM OFF"
290  FOT I = 1 TO 1000: NEXT : GOTO 10
300  IF FK > 12 THEN FK = 1
310  IF FK < > 1 GOTO 410
320  GOSUB 1260: VTAB 5
330  PRINT : PRINT "OUTDOOR AIR TEMP = ";ZT(10);" DEG."
```

```
-continued
390  PRINT : PRINT T4:" ";T5:" ";AX%(11);" ";AX%(12);"
     ";AX%(13);" ";COMPS
400  PRINT : PRINT AX%(15);" "; INT (100 * LS) / 100;" ";T2
410  RESTORE : FOR I = 1 TO 12: READ DUMS: NEXT :AX%(14) =
     1: GOSUB 1070
420  FOR I = 1 TO 15: READ A1,A2
430  RR = A1 * AY%(I) − A2:ZT(I) = 0.85 * ZT(I) + 0.15 *
     RR:ZT(I) = INT (100 * ZT(I)) / 100: NEXT
440  IF FK < > 4 GOTO 480
450  GOSUB 1260: VTAB 5: FOR I = 1 TO 9
460  PRINT : PRINT "NO. ";I;" ZONE TEMP = ";ZT(I);" DEG. ";
     INT (10 * FW(I)) / 10;" ";T3(I)
470  NEXT
480  IF FK < > 8 GOTO 530
490  GOSUB 1260: VTAB 5: FOR I = 1 TO 32 STEP 8
500  PRINT : PRINT :I2 = I + 7
510  FOR J = 1 TO 12: PRINT AZ%(I);" ";
520  NEXT J: NEXT I
530  IF T1$ = "FIRST" THEN T2 = VAL (MINUTES)
540  T1$ = "NOT"
550  IF ZT(10) > 75.0 THEN AX%(10) = 0
560  IF ZT(10) < 74.0 THEN AX%(10) = 1
570  AX%(3) = 1:AX%(4) = 1:AX%(8) = 1
580  TI = VAL (MINUTES)
590  IF TI < > T2 GOTO 730
600  T2 = TI + 25
610  IF T2 > 59 THEN T2 = T2 − 60
620  FOR I = 1 TO 9
630  IF I = 3 OR I = 4 OR I = 8 GOTO 720
640  ERR = ZT(I) − ZT(4)
650  CHANGE = GAIN * (ERR − AG * PE(I))
660  PE(I) = ERR:FW(I) = FW(I) + CHANGE
670  IF FW(I) > 25 THEN FW(I) = 25
680  IF FW(I) < 0 THEN FW(I) = 0
690  T3(I) = INT (TI + FW(I))
700  IF T3(I) > 59 THEN T3(I) = T3(I) − 60
710  IF T3(I) < > INT ( VAL (MINUTES$) ) THEN AX%(I) = 1
720  NEXT
730  FOR I = 1 TO 9
740  IF I = 3 OR I = 4 OR I = 8 GOTO 770
750  IF FW(I) > = 25.0 GOTO 770
760  IF T3(I) = INT ( VAL (MINUTES$) ) THEN AX%(I) = 0
770  NEXT I
780  IF COMP$ = "ON" GOTO 920
790  IF ZT(10) < 71.0 GOTO 830
800  FOR A = 1 TO 9
810  IF ZT(A) > 74.0 GOTO 840
820  NEXT
830  GOTO 140
840  COMP$ = "ON"
850  U7 = ZT(10)
860  LS = 0.0
870  T5 = TI + 12
880  FOR A = 11 TO 12:AX%(A) = 1: NEXT
890  GOSUB 900: GOTO 140
900  IF T5 > 59 THEN T5 = T5 − 60
910  RETURN
920  IF T4 < > TI GOTO 940
930  AX%(12) = 1:
940  IF T5 < > TI GOTO 140
950  BEL = NOW:NOW = ZT(4) − 72.0:U6 = U7:U7 = ZT(10)
960  LS = LS + U3 * (NOW − U4 * BEL) + U5 * (U7 − U6)
970  IF LS > 0.0 GOTO 1010
980  LS = − 0.5
990  IF ZT(10) > 70.0 GOTO 1060
1000 COMP$ = "OFF":AX%(11) = 0: GOTO 140
1010 IF LS > 12.0 THEN LS = 13
1020 T4 = INT (TI + LS)
1030 IF T4 > 59 THEN T4 = T4 − 60
1040 IF T4 < > TI THEN AX%(12) = 0
1060 T5 = TI + 12: GOSUB 900: GOTO 140
1070 POKE - 16239,255
1080 FOR I = 1 TO 32 STEP 8
1090 FOR J = 1 TO 200:RK% = PEEK ( − 16240) : IF RK% =
     2 GOTO 1110: NEXT J
1100 GOTO 1240
1110 RK% = 0: FOR J = 0 TO 7:RK% = RK% + (2    J) *
     AX%(I + J): NEXT J
1120 POKE - 16239,RK%: NEXT I
1130 POKE - 16239,210
1140 FOR I = 1 TO 68
1150 FOR J = 1 TO 200:RR% = PEEK ( − 16240)
```

```
1160  IF RR% = 3 THEN GOTO 1180
1170  NEXT J: GOTO 1240
1180  I0%(I) = PEEK ( - 16239): NEXT I
1190  FOR I = 1 TO 32:AY%(I) = 256 * I0%(2 * I - 1) +
      I0%(2 * I): NEXT I
1200  FOR I = 65 TO 68:RK% = I0%(I):RW% = 128:RR% = 8 * (I - 65)
1210  FOR J = 8 TO 1 STEP - 1:AZ%(RR% + J) = RW% / RK%:RK%
      = RK% - RW% * AZ%(RR% + J)
1220  RW% = RW% / 2: NEXT J: NEXT I
1230  RETURN
1240  PRINT "I0 ERROR"
1250  STOP
1260  HOME : HTAB 10
1270  PRINT "DATE: ";MTH$;" ";DAY
1280  VTAB 2: HTAB 10
1290  PRINT "TIME: ";HOUR;":"; MINUTES$;":"; SEC$;" "; AMPM$
1300  RETURN
1310  FW(1) = 13
1320  FW(2) = 13
1330  FW(3) = 25
1340  FW(4) = 25
1350  FW(5) = 13
1360  FW(6) = 25
1370  FW(7) = 13
1380  FW(8) = 25
1390  FW(9) = 13
1400  U5 = 0.25:U3 = 4.0:U4 = 0.7
1410  GAIN = 1.5:AG = 0.5
1420  FK = 0
1430  DD$ = CHR$ (4)
1440  RETURN
```

Statements for the above program may be defined as follows:

A. Preliminary Statements (1) Data and dimension statements (Statements #10 through #130).

(2) Initialization statements are placed at the end of the program. (Statements #1310 through #1440).

(3) Print date and time sub-routine is placed near the end of the program and is called in as required. (Statements #1260 through #1300).

(4) Input/output sub-routine, is placed near the end of the program and is called in as required. (Statements #1070 through #1250).

The main program flow is from statement #140 through #1060. Therefore, (Items 1 and 2 above) Data, dimension, and initialization, statements are not repeated; and (Items 3 and 4) The two multiple use sub-routines, are placed near the end of the program to make it run faster.

B. Data, Dimension, Initialization, Statements and Sub-Routines (1) Data Statements—Statement #10 clears all registers and reserved memory. Statement #20 supplies 1 to 12 month data for printing time and date—referred to as DUM$ in main program nomenclature. Statements #30 through #60 supply calibration constants for calculating 10 analog input parameters, referred to as A1, A2, in main program nomenclature.

(2) Dimension Statement—Statement #90 assigns reserved memory arrays for the following entities:
I0% (68)—68 bytes for 68 bytes of input data
AY% (32)—32 bytes for 32 raw data analog inputs
A2% (32)—32 bytes for 32 digital input status data
AX% (32)—32 bytes for 32 digital output (relay) status data
ZT(32)—32 bytes for 32 calculated analog input parameters.

If the reserved memory array is designated as I0%, AY%, AZ%, AX%, then two bytes per unit (I) are reserved as integer storage, only. Integer storage is appropriate because:
I0%—68 bytes of binary numbers as integers "1" or "0".
AY%—Base 10 intger numbers calculated from 12 bit binary numbers.
AZ%—Integers "1" or "0".
AX%—Integers "1" or "0".

If reserved memory array is designated as ZT(I) then 5 bytes per unit (I) are reserved as decimal floating point storage.

(3) Initialization Statements—Statement #100 resets remote terminal. Statement #120 initializes compressor startup control function and initializes fan timing function. Statement #130, go to statement #1310 for balance of initialization. Statements #1310 through #1390 set initial running time for each fan to be used with fan two-mode controller function [FW(I)]. Statement #1400 tuning constants for compressor two-mode controller function. Statement #1410 tuning constants for fan two-mode controller function. Statement #1420 initialize sequence counter. Statement #1440 return to main program flow.

(4) Print Date and Time Sub-Routine—Statement #1260 clear screen and center print-out at top of screen. Statement #1270 print appropriate month and day of the week. Statement #1280 assigns space for next line of print-out two lines below and in center of screen. Statement #1290 prints time in hours, minutes, seconds, as AM or PM. Statement #1300 return to next statement in main program flow.

(5) Input/Output Sub-Routine—Statement #1070 AICA send "FF" to remote terminal to signify that apple has data to transmit. Statements #1080 through #1090 checks AICA for ready to send 4 bytes of 8 bit data to remote terminal within specified time (I=200). If check doesn't concur, program skips to statement #1240 and stops at #1250. Statement #1110 translates status information or commands in array AX%(32) into 4 bytes of binary numbers. Statement #1120 sends 4 bytes of data to remote terminal. Statement #1130 tells remote terminal that CPU is ready to receive data through AICA controller. Statements #1140 through #1160 checks AICA for ready to receive 68 bytes of data from remote terminal within specified time (I=200). If check doesn't concur, program skips to statement #1240 and stops at #1250. Statement #1180 stores 10%(68) information into reserved 10% array in memory. Statement #1190 discards last 4 bits of each 2 bytes of first 64 successive bytes of input information and translates remaining 12 bits into integer decimal number and stores each number into AY% array. Statements #1200 through #1220 translates last 4 bytes of 68 byte input data into 32 successive digital input status integers "1" or "0" and stores each number into AZ% array. Statement #1230 return to main program flow.

C. Main Program Nomenclature and Variances

| (1) Input/Output Nomenclature | |
|---|---|
| Designation | Analog Inputs |
| ZT (1) | Zone No. 1 Temperature |
| ZT (2) | None No. 2 Temperature |
| ZT (3) | Zone No. 3 Temperature |
| ZT (4) | Zone No. 4 Temperature |
| ZT (5) | Zone No. 5 Temperature |
| ZT (6) | Zone No. 6 Temperature |
| ZT (7) | Zone No. 7 Temperature |
| ZT (8) | Zone No. 8 Temperature |
| ZT (9) | Zone No. 9 Temperature |
| ZT (10) | Outdoor Air Temperature |
| | Digital Inputs |
| AZ% (1) | D/I No. 1 Fan |
| AZ% (2) | D/I No. 2 Fan |
| AZ% (3) | D/I No. 3 Fan |
| AZ% (4) | D/I No. 4 Fan |
| AZ% (5) | D/I No. 5 Fan |
| AZ% (6) | D/I No. 6 Fan |
| AZ% (7) | D/I No. 7 Fan |
| AZ% (8) | D/I No. 8 Fan |
| AZ% (9) | D/I No. 9 Fan |
| AZ% (10) | Not used (spare) |
| AZ% (11) | Start compressor |
| AZ% (12) | Unload compressor |
| AZ% (13) | Not used (spare) |
| AZ% (14) | Enable compressor control |
| AZ% (15) | All dampers open |
| AZ% (16) | Not used (spare) |
| AZ% (17) | No. 1 damper closed |
| AZ% (18) | No. 2 damper closed |
| | Function |
| AZ% (19) | No. 3 Damper closed |
| AZ% (20) | No. 4 Damper closed |
| AZ% (21) | No. 5 Damper closed |
| AZ% (22) | No. 6 Damper closed |
| AZ% (23) | No. 7 Damper closed |
| AZ% (24) | No. 8 Damper closed |
| AZ% (25) | No. 9 Damper closed |
| | Relays |
| AX% (1) | No. 1 Fan Control Relay |
| AX% (2) | No. 2 Fan Control Relay |
| AX% (3) | No. 3 Fan Control Relay |
| AX% (4) | No. 4 Fan Control Relay |
| AX% (5) | No. 5 Fan Control Relay |
| AX% (6) | No. 6 Fan Control Relay |
| AX% (7) | No. 7 Fan Control Relay |
| AX% (8) | No. 8 Fan Control Relay |
| AX% (9) | No. 9 Fan Control Relay |
| AX% (10) | Not used (spare) |
| AX% (11) | Start compressor relay |
| AX% (12) | Unload compressor |
| AX% (13) | Not used (spare) |
| AX% (14) | Enable computer control relay |
| AX% (15) | Close all dampers relay |

| (2) Hardware Clock Software String Variables | |
|---|---|
| T$ | = Hardware clock string variables |
| MTH$ | = Month |
| DAY$ | = Day |
| HOUR$ | = Hour |
| MINUTE$ | = Minutes |
| SEC$ | = Seconds |
| (3) Variables Within Main Program Flow | |
| MTH | = Month : COMP$ = Compressors "on" or "off" |
| HR | = HR : T1$ = First fan cycle time |
| AMP$ | = Status of hour in AM or PM |
| FK | = Value of sequence counter |
| FW(I) | = Fan run time for each fan, fans 1 through 9 |
| T1 | = Present value time in minutes after the hour |
| T2 | = Starting time of next fan sample interval in minutes after the hour. |
| T3(I) | = Fan turn-off or stop time for each fan in minutes after the hour. |
| T5 | = Starting time of the next compressor sample interval in minutes after the hour. |
| T4 | = Compressor unload time in minutes after the hour. |
| LS | = Compressor load cycle time |

D. "System Off" Between 10:00 PM and 7:00 AM

Statement #140 increment sequence counter. Statement #150 input data from slot #3 (hardware clock). Statement #160 input string variables from hardware clock to memory. Change output back to "CRT". Statements #170-#180 string variables from hardware clock put into memory. Change output back to "CRT". Statements #190-#220 time defined as AM or PM. Statement #230 variable MTH defined. Statement #240 clear all registers. Statement #250 determine month. Statement #260 if time between 10:00 PM and 7:00 AM continue. If time between 7:00 AM and 10:00 PM skip to statement #300. Statement #270 go to date and time sub-routine print date and time and return. Statement #280 print "System Off". Statement #290 delay for specified time (I=1000) and return to statement #10.

E. System Operational Between 7:00 A.M. and 10:00 P.M.

Statement #300 reset sequence counter. Statement #310 if count is not equal to "1" skip to statement #410. Assume count is equal to "1" and proceed to print-out screen #1. Statement #320 go to date and time sub-routine and print out date and time. Statement #330 print analog input parameter. Statement #390 print status of T4, T5, AX%(11), AX%(12), COMP$. Statement #400 print status of AX%(15), LS, T2. Statement #410 restore all registers, read DUM$ data, enable computer control (relay #14 sets up a control relay sequence that disables existing HVAC analog control), go to input-/output sub-routine #1070. Statement #420 read A1, A2, data. Statement #430 digital filter function to calculate smoothed data values for storage in ZT(I) for 10 values of analog input parameters. This calculation minimizes effects of "noise" in the system. Statement #440 if sequence counter is not equal to 4 skip to statement #480. Assume count is equal to "4" and proceed to print out screen #2. Statement #450 go to date and time sub-routine and print out date and time. Statements #460 through #470 print analog input parameter. Print status of FW(I), T3(I). Statement #480 if sequence counter is not equal to "8" skip to statement #530, assume that count is equal to "8" and proceed to print out screen #3. Statements #490 through #520 print date and time and status of digital inputs. Statement #530 initialize fan sample interval in minutes after the hour. Statement #540 identifies fan sample interval as "Not" first or starting interval. Statement #550 if outside temperature is over 75 F.° then close all dampers. Statement #560 if outside temperature is less than 74 F.° then open all dampers.

F. Fan Control Sub-routine (Statements #570 through #770)

Statement #570 turn "on" fans in zones #3, #4 and #8, these are the hot zones on each of three floors (three zones per floor). These fans will run continuously. Statement #580 TI=minutes after the hour (now). Statement #590 if TI not equal to T2 skip to statement #730. Assume that TI not equal to T2. Statements #730 through #740, if fans #3, #4, #8, are being evaluated, skip to #770. Statement #770 evaluate next successive fan (1 through 9). Statement #75, if fan running time is greater than sample time (25 minutes) go to #770. Statement #760 if T3 (I) is equal to its value in minutes after the hour then turn fan "off". Statement #780 if COMP$="on" go to #920. Assume COMP$="off". Statement #790 if outside temperature is greater than 71° F. go to #140 and return to main program flow. Repeat statement #590 and assume TI=T2. Statement #600 increment new fan sample time. Statement #610 change T2 into value of minutes after the hour. Statements #620 through #630 if I=3, 4, or 8, then skip calculations for two-mode fan control function. Statements #640 through #660 fan two-mode controller function:

$FW(I) = FW(I) + $ Change, in minutes
Change $= GAIN*(ERR - AG*PE(I))$, in minutes
$ERR = ZT(I) - ZT(4)$, in F°
Note: Zone 4 is hot zone and therefore comparison or base zone.
$PE(I) = ERR(N-1)$ or last error
$GAIN = 1.5$, $AG = 0.5$ Statement #670 limits maximum value of FW(I) to 25 minutes in order to inhibit reset-windup. Statement #680 limits minimum value of FW(I) to 0 minutes in order to inhibit reset windup at low end of scale. Statement #690 limits T3 to integer value. Statement #700 changes value of T3 into value of minutes after one hour. Statement #170 if T3(I) is not equal to its value in minutes after the hour then fan continues to run.

G. Compressor Control Sub-routine (Statements #780 thru #1060)

Statements #800 through #820, if any zone temperature is greater than 74° F. skip to #840. Statement #840 COMP$="on". Statements #850 through #860 initializes functions "U7" and "LS" for compressor two-mode controller calculations. Statement #870 starting time of next compressor cycle interval. Statement #880 compressor "on", and unload compressor. Statements #890 through #910, specify T5 or compressor sample interval to minutes after the hour and return to main program flow. Repeat statement #780 and assume that COMP$="on". Statement #920, if compressor unload time T4 is not equal to minutes after the hour, skip to statement #940. Assume that T4 is not equal to minutes after the hour. Statement #940, if compressor sample time T5 is not equal to minutes after the hour, return to main program flow. Repeat statement #920 and assume that T4=minutes after the hour. Statement #930, compressor unloaded. Statement #940, return to main program flow. Repeat statement #940 and assume that T5=minutes after the hour. Statements #950 through #960, compressor two-mode controller function:

$LS = LS + U_3*(NOW - U_4*BEL) + U_5*(U_7 - U_6)$ in minutes
$NOW = ZT(4) - 72$, in F° degrees
NOTE: Zone 4 is hot zone or base zone for comparison
$BEL = NOW(N-1)$, or last error
$U_3 = 4$, $U_4 = 0.7$, $U_5 = 0.25$, $U_7 = ZT(12)$
$U_6 = ZT(10)$ $(N-1)$ or ZT last.

Statement #970, if "LS" is greater than 0 skip to #1010. Assume that LS is greater than 0. Statement #1010, limits "LS" for effects of reset-windup. Statement #1030 converts compressor unload time, T4, to an integer. Statement #1030 converts T4 to a value of minutes after the hour. Statement #1040 loads compressor whenever T4 is not equal to minutes after the hour. Statement #1060 skips to statement #900 and converts compressor sample time to value of minutes after the hour and then returns to main program flow. Repeat statement #970 and assume that "LS" is less than 0. Statement #980, limit "LS" for reset-windup for low end of scale. Statement #990, if outside temperature is greater than 70 F.°, return to main program flow. Repeat statement #990 if outside temperature is less than 70 F.°, continue. Statement #1000, turn off compressor and return to main program flow.

Thus, as described by the foregoing, the present invention provides a control system for refrigeration or air conditioning installations which will operate their power consuming appliances automatically to maintain set point performance and yet with a minimum consumption of power over the prescribed operating period.

The compressor in the refrigeration or air conditioning system will operate with less overall power consumption over a period of time because it is cycled "on" and "off" during each of a continuous series of time sampling periods. During the "power-on" cycle in each sampling period, the compressor is caused to operate at a higher than usual coefficient of performance, and this allows it to operate at essentially an unloaded condition at greatly reduced power consumption during the remaining power regulation portion of the sampling period. Yet when these power-on and power-regulation phases are automatically determined by the two-mode control function, the set point temperature in the control zone can be maintained as described. Simultaneously, the fans in the additional zones being conditioned are modulated using their own two-mode control function to switch on and off during separate time periods to further maintain the desired temperature levels.

The invention is adaptable to a wide variety of refrigeration and air conditioning installations having different types of appliances and control devices as long as they can be cycled in "on" and "off" during consecutive time sampling periods. When supplied with an appropriate program, the remote terminal and CPU will operate the control system completely automatically and also provide a continuous status display of zone temperature and equipment parameters.

In addition to the control functions provided by the computer, it can also serve to monitor and display on its CRT display the values of other inputs from various sensors not actually required for control but capable of providing other useful information. This could include outside air temperature, outside humidity or other outside environmental or zone condition information or status information on the system in operation, such as damper positions, motor switch conditions, and the like.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for increasing the efficiency and reducing the power consumption of a refrigeration system have a compressor driven by a motor, first heat exchanger means with evaporator means located in a control zone and one or more additional zones to be cooled, said first heat exchanger means being connected to the compressor inlet, fan means associated with said first heat exchanger means, a conduit for liquid refrigerant interconnecting an outlet from said compressor to a second heat exchanger means, means for varying the load on said compressor, a liquid coolant means connected to said second heat exchanger means, a receiver for cooled liquid refrigerant connected to said second heat exchanger means, conduit means connected from the outlet of said receiver to said evaporator means of said first heat exchanger means, and expansion valve means in said conduit means, said method comprising the steps of:

establishing a desired set point temperature to be maintained in a predetermined one of said zones designated a control zone;

constantly measuring the actual temperature in said control zone;

establishing a continuous series of equal time sampling periods for said compressor;

operating said compressor at a relatively high load for a predetermined first portion of each time sampling period responsive to said measured temperature and at a relatively low load for the remaining or second portion of the sampling period;

during each time sampling period, determining the difference in the actual temperature from the set point temperature in the control zone;

calculating any change in the length of time for the first portion of the next sampling period required to maintain the set point temperature in the control zone from said difference;

controlling the compressor responsive to said calculation accordingly so that it is cycled from high load to low load during each time sampling period;

establishing a continuous series of equal time sampling periods for each of said fans or valves; and controlling the length of time during the first parts of said time sampling periods for each of said fans or valves that each of said fans or valves are turned on for purposes of zone temperature control.

2. The method of claim 1 wherein the time sampling period for the compressor is between 10 and 15 minutes.

3. The method of claim 1 wherein the time sampling period for the compressor is approximately 12 minutes.

4. The method of claim 1 wherein any change in the length of time for the first portion of each time sampling period is calculated using a two-mode control function that takes into account both gain and delay.

5. The method of claim 1 wherein said two-mode control function for the compressor is defined by the expression:

$$\Delta U_k = \text{Gain}\,(e_k - ae_{k-1})$$

where:

$\Delta U_k$ = Incremental change in time (minutes) to hold system in equilibrium Gain = Observed system gain in units of min/F.°

$e_k$ = Error in target temperature minus actual measured temperature in F.° at end of sampling time interval a = Observed dimensionless constant that allows for system delay $e_{k-1}$ = Error in target temperature minus actual measured temperature in F.° at end of last sampling time interval 6. The method of claim 5 wherein the Gain in the two-mode control function is obtained by: (1) turning the fan "on" at its steady state in the control zone; (2) stabilizing the compressor at a relatively no-load level; (3) introducing a step change in loading to a relatively high load level; (4) plotting the temperature change vs time in the control zone; (5) measuring the response time to stabilize the system; and (6) determining the value of G calculated by measuring $E_s$, the step function change in zone temperature and $T_{sr}$, the response time for step function change, using the expression:

$$G \approx T_{sr}/E_s.$$

7. The method as described in claim 1 including the additional steps of:

continuously running the fan in the control zone;

continuously measuring the temperature in each of the additional zones;

during each time sampling period for the fans, measuring any variation in the actual temperature in each additional zone from the set point temperature in the control zone; and for each additional zone, calculating any change in the length of time for the first portion of the next fan time sampling period required to maintain the set point temperature in that zone.

8. The method of claim 7 wherein the amount of "on" time for each fan in a said additional zone for a particular fan time sampling period is calculated by means of a two-mode control function using actual temperature input data from the same additional zone received during the immediately preceding fan time sampling period.

9. The method of claim 8 wherein said two-mode control function for determining the variation in "on" time of each fan during a time sampling period is defined by the expression:

$$\Delta U_k = \text{Gain}\,(e_k - ae_{k-1})$$

where:

$\Delta U_k$ = Incremental change in time (minutes) to hold system in equilibrium Gain = Observed system gain in units of min/F.°

$e_k$ = Error in target temperature minus actual measured temperature in F.° at end of sampling time interval a = Observed dimensionless constant that allows for system delay $e_{k-1}$ = Error in target temperature minus actual measured temperature in F.° at end of last sampling time interval.

* * * * *